United States Patent
Matsui et al.

(10) Patent No.: US 6,594,720 B1
(45) Date of Patent: Jul. 15, 2003

(54) DATA PROCESSING SYSTEM HAVING A PC CARD TYPE INTERFACE WITH ASSIGNED ADDRESSING

(75) Inventors: Shigezumi Matsui, Kodaira (JP); Ikuya Kawasaki, Kodaira (JP); Susumu Narita, Kokubunji (JP); Masato Nemoto, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/438,337

(22) Filed: Nov. 13, 1999

Related U.S. Application Data

(63) Continuation of application No. 09/191,219, filed on Nov. 12, 1998, now Pat. No. 6,049,844, which is a continuation of application No. 08/524,701, filed on Sep. 7, 1995, now Pat. No. 5,848,247.

(30) Foreign Application Priority Data

| Sep. 20, 1994 | (JP) | ................................................ 6-251394 |
| Mar. 20, 1995 | (JP) | ................................................ 7-085931 |
| Sep. 13, 1995 | (JP) | ................................................ 7-260873 |

(51) Int. Cl.⁷ .............................................. G06F 13/00
(52) U.S. Cl. .......................... 710/301; 710/8; 711/202
(58) Field of Search ........................ 710/8, 9, 12, 13, 710/22, 26, 35, 52, 104, 301; 711/2, 202

(56) References Cited

U.S. PATENT DOCUMENTS

| 5,519,851 A | | 5/1996 | Bender et al. ............... 395/500 |
| 5,537,654 A | | 7/1996 | Bedingfield et al. .......... 710/14 |
| 5,555,510 A | | 9/1996 | Verseput et al. ........ 364/514 R |
| 5,564,055 A | * | 10/1996 | Asnaashari et al. .......... 710/301 |
| 5,574,654 A | | 11/1996 | Bingham et al. ............ 364/487 |
| 5,590,373 A | | 12/1996 | Whitley et al. .............. 395/828 |
| 5,596,728 A | | 1/1997 | Belmont ....................... 395/281 |
| 5,604,870 A | | 2/1997 | Moss et al. ................... 710/100 |
| 5,724,529 A | | 3/1998 | Smith et al. ................. 710/129 |
| 5,768,568 A | * | 6/1998 | Inui et al. ...................... 710/10 |
| 5,818,029 A | | 10/1998 | Thomson ...................... 710/72 |
| 5,848,247 A | | 12/1998 | Matsui et al. ................ 710/104 |
| 6,049,844 A | * | 4/2000 | Matsui et al. ................ 710/104 |

OTHER PUBLICATIONS

"RISC Chip SH7604 Directly Connectable to Synchronous DRAM" by Nikkei Electronics published by Nikkei–MacGraw Hill, Inc. (Feb. 14, 1994) pp. 79–91.

* cited by examiner

Primary Examiner—Glenn A. Auve
(74) Attorney, Agent, or Firm—Loudermilk & Associates

(57) ABSTRACT

A microprocessor comprising a bus state controller and for use in a personal computer or the like. The bus state controller includes control registers such as wait controllers, and parallelly controls the interfaces of various semiconductor memories (ROM, burst ROM, SRAM, PSRAM, DRAM and synchronous RAM) and PC cards (memory and I/O cards). Also included in the bus state controller is a control register for controlling the time to set up PC card start signals where a synchronous DRAM(s) is configured. The address space of an external bus of the microprocessor is divided into a predetermined number of areas to which the semiconductor memories and PC cards are fixedly assigned. The microprocessor further comprises a memory management unit for converting an internally prepared logical address to a physical address.

23 Claims, 23 Drawing Sheets

( ) : FOR I/O CARD ONLY

FIG. 10

| SIGNAL NAME | INPUT/ OUTPUT | FUNCTION ||| REMARKS |
| --- | --- | --- | --- | --- | --- |
| | | SEMICONDUC- TOR MEMORY | MEMORY CARD | I/O CARD | |
| A0~25 | OUTPUT | ADDRESS OUTPUT | ADDRESS OUTPUT | ADDRESS OUTPUT | |
| D0~15 | INPUT/ OUTPUT | DATA INPUT/ OUTPUT | DATA INPUT/ OUTPUT | DATA INPUT/ OUTPUT | |
| D16~23/ PORT0~7 | | DATA INPUT/ OUTPUT PORT INPUT/ OUTPUT | — | — | WHEN BUS IS 32 BITS WIDE WHEN BUS IS 16 BITS WIDE |
| D24~31 | | DATA INPUT/ OUTPUT | — | — | |
| -BS | OUTPUT | BUS CYCLE START | BUS CYCLE START | BUS CYCLE START | ASSERTED PER CYCLE FOR BURST |
| -CS0~4 | OUTPUT | CHIP SELECT | — | — | |
| -CS5/-CE1A | | CHIP SELECT | CARD SELECT 1 | — | MEMORY CARD ONLY FOR AREA 5 |
| -CS6/-CE1B | | CHIP SELECT | CARD SELECT 1 | CARD SELECT 1 | |
| MD3/-CE2A | OUTPUT | BUS WIDTH SET | CARD SELECT 2 | — | BUS WIDTH SET FOR AREA 0 -CE2A FOR AREA 5 -CE2B FOR AREA 6 |
| MD4/-CE2B | | | CARD SELECT 2 | CARD SELECT 2 | |
| MD5/-RAS2 | | ENDIAN SET -RAS2 | — | — | ENDIAN SET FOR RESET -RAS2 : SECOND-SET DRAM |
| -RAS/-CE | OUTPUT | -RAS -CE | — | — | FOR DRAM/SRAM FOR PSRAM |
| -CASLL/ -CAS/ -OE | OUTPUT | -CASLL -CAS -OE | — | — | CORRESPONDING TO D0-D7 FOR DRAM FOR SDRAM FOR PSRAM |
| -CASLH | | -CASLH | — | — | CORRESPONDING TO D8-D15 FOR DRAM |
| -CASHL/ -CAS2L | | -CASHL -CAS2L | — | — | CORRESPONDING TO D16-D23 FOR DRAM CORRESPONDING TO D0-D7 FOR 2 DRAMs |
| -CASHH/ -CAS2H | | -CASHH -CAS2H | — | — | CORRESPONDING TO D24-D31 FOR DRAM CORRESPONDING TO D8-D15 FOR 2 DRAMs |

FIG. 11

| SIGNAL NAME | INPUT/ OUTPUT | FUNCTION | | | REMARKS |
|---|---|---|---|---|---|
| | | SEMICONDUC- TOR MEMORY | MEMORY CARD | I/O CARD | |
| -WE0/ DQMLL | OUTPUT | DQMLL -WE0 | — | — | CORRESPONDING TO D0-D7 FOR DRRAM CORRESPONDING TO D0-D7 FOR OTHER MEMORY |
| -WE1/ DQMLU | | DQMLU -WE1 | -WE/-PGM — | -WE/-PGM — | CORRESPONDING TO D8-D15 FOR SDRAM CORRESPONDING TO D8-D15 FOR OTHER MEMORY |
| -WE2/ DQMUL/ -ICIORD | | DQMUL -WE2 — | — | — -ICIORD | CORRESPONDING TO D16-D23 FOR SDRAM CORRESPONDING TO D16-D23 FOR OTHER MEMORY I/O READ CONTROL FOR AREA 6 |
| -WE3/ DQMUU/ -ICIOWR | | DQMUU -WE3 — | — | — -ICIOWR | CORRESPONDING TO D24-D31 FOR SDRAM CORRESPONDING TO D24-D31 FOR OTHER MEMORY I/O WRITE CONTROL FOR AREA 6 |
| RD/-WR | OUTPUT | -WE | | | SEMICONDUCTOR : DRAM AND SDRAM |
| -RD | | -OE | -OE | -OE | SEMICONDUCTOR : SRAM |
| CKE | OUTPUT | CKE | — | — | CLOCK ENABLE FOR SDRAM |
| -WAIT | INPUT | — | -WAIT | -WAIT | WAIT REQUEST FOR AREAS 5 AND 6 |
| WP/ -IOIS16 | INPUT | — | WP — | — -IOIS16 | WRITE PROTECTION FOR AREAS 5 AND 6 BUS WIDTH OF 16 BITS DESIGNATED FOR AREA 6 |
| -CD1, -CD2 | INPUT | — | — | — | CARD INSERTION DETECTED |
| RESET | — | — | RESET | RESET | RESET DESIGNATED FOR AREAS 5 AND 6 |
| -BREQ | INPUT | — | — | — | FOR I/O CONTROLLER |
| -BACK | OUTPUT | — | — | — | FOR I/O CONTROLLER |
| VCC | — | VCC | VCC | VCC | SUPPLY VOLTAGE |
| GND | — | GND | GND | GND | GROUNDING POTENTIAL |

FIG. 14

| NO. | STATE NAME | BUS STATE CONTROLLER STATUS | CORRESPONDING CYCLE |
|---|---|---|---|
| ST1 | IDLE | STANDBY STATE | |
| ST2 | PCMCIA TED1 | PCMCIA-WE/-OE SETUP TIME DELAYED BY 1 CYCLE | Tpcm0, Tpci0 |
| ST3 | PCMCIA TED2 | PCMCIA-WE/-OE SETUP TIME DELAYED BY 1 CYCLE | Tpcm0w, Tpci0w |
| ST4 | PCMCIA TED3 | PCMCIA-WE/-OE SETUP TIME DELAYED BY 1 CYCLE | Tpcm0w, Tpci0w |
| ST5 | NORM T1 | ACCESS START CYCLE | Tpcm1, Tpci1 |
| ST6 | NORM TW | WAIT CYCLE | Tpcm1w, Tpci1w |
| ST7 | NORM T2 | ACCESS END CYCLE | Tpcm2, Tpci2 |
| ST8 | PCMCIA TEH1 | PCMCIA-WE/-OE HOLD TIME DELAYED BY 1 CYCLE | Tpcm2w, Tpci2w |
| ST9 | PCMCIA TEH2 | PCMCIA-WE/-OE HOLD TIME DELAYED BY 1 CYCLE | Tpcm2w, Tpci2w |
| ST10 | PCMCIA TEH3 | PCMCIA-WE/-OE HOLD TIME DELAYED BY 1 CYCLE | Tpcm2w, Tpci2w |

FIG. 15

| NO. | CONDITIONS FOR STATE TRANSITION |
|---|---|
| (1) | MEMORY ACCESS REQUEST GENERATED IN EXTERNAL BUS FREE STATE (SETUP TIME DELAYED : TED OF PCR=1−3) |
| (2)~(3) | END OF SETUP TIME DELAY BY STATE ST2 OR ST3 (TED OF PCR=1 OR 2) |
| (4)~(5) | END OF SETUP TIME DELAY BY STATE ST2 OR ST3 (TED OF PCR=2 OR 3) |
| (6) | END OF SETUP TIME DELAY BY STATE ST4 (TED OF PCR=3) |
| (7) | MEMORY ACCESS REQUEST GENERATED IN EXTERNAL BUS FREE STATE (SETUP TIME NOT DELAYED : TED OF PCR=0) |
| (8) | END OF ACCESS START CYCLE (NO WAIT STATE : WAIT OF WCR2=0) |
| (9) | END OF ACCESS START CYCLE (WAIT STATE : WAIT OF WCR2=1) |
| (10) | WAIT CYCLE NOT ENDED |
| (11) | WAIT CYCLE ENDED |
| (12) | ACCESS END CYCLE ENDED (BURST NOT ENDED) |
| (13) | ACCESS END CYCLE ENDED (HOLD TIME NOT DELAYED, SETUP TIME NOT DELAYED, ALL CYCLES NOT ENDED) |
| (14) | ACCESS END CYCLE ENDED (HOLD TIME NOT DELAYED, SETUP TIME DELAYED, ALL CYCLES NOT ENDED) |
| (15) | ACCESS END CYCLE ENDED (HOLD TIME NOT DELAYED, ALL CYCLES ENDED) |
| (16)~(18) | ACCESS END CYCLE ENDED (HOLD TIME DELAYED : TEH OF PCR=1−3) |
| (19) | END OF HOLD TIME DELAY BY STATE ST10 (THE OF PCR=3) |
| (20) | END OF HOLD TIME DELAY BY STATE ST9 (TEH OF PCR=2 OR 3) |
| (21) | END OF HOLD TIME DELAY BY STATE ST8 (SETUP TIME DELAYED, ALL CYCLES NOT ENDED) |
| (22) | END OF HOLD TIME DELAY BY STATE ST8 (SETUP TIME NOT DELAYED, ALL CYCLES NOT ENDED) |
| (23) | END OF HOLD TIME DELAY BY STATE ST8 (ALL CYCLES ENDED) |

DATA PROCESSING SYSTEM HAVING A PC CARD TYPE INTERFACE WITH ASSIGNED ADDRESSING

This application is a continuation of Ser. No. 09/191,219, filed on Nov. 12, 1998, now U.S. Pat. No. 6,049,844, which is a continuation of Ser. No. 08/524,701, filed on Sep. 7, 1995, now U.S. Pat. No. 5,848,247.

BACKGROUND OF THE INVENTION

The present invention relates to a microprocessor and, more particularly, to improvements in the external bus interface of a microprocessor.

There are microprocessors (micro-controllers) equipped with an external bus capable of being directly connected to various semiconductor memories including a synchronous DRAM (dynamic random access memory). Such microprocessors are discussed illustratively in Nikkei Electronics published by Nikkei-MacGrow-Hill, Inc. (Feb. 14, 1994, pp. 79–91).

So-called PC cards such as memory cards and I/O cards are now in widespread use. The conditions for interfacing the PC cards to microprocessors and the like have been standardized by the Japan Electronics Industry Development Association (JEIDA) and the Personal Computer Memory Card International Association (PCMCIA). The PC card interface includes the IC memory card and I/O card interface provisions for the 68-pin type, stipulated in "6. Electrical Interface Specifications" of the Guideline Ver. 4.1. The PC card interface is implemented illustratively by use of a dedicated integrated circuit (IC) chip such as the 82365SL.

SUMMARY OF THE INVENTION

In conventional microprocessors, the bus for coupling to PC cards is furnished independently of the bus for connecting semiconductor memories. Furthermore; the PC cards are connected to the bus via the dedicated IC chip which controls the PC card interface. This entails a complicated bus constitution and an increasing number of design steps required where the PC card interface is to be incorporated in personal computers and portable data processing terminals. With more parts to be attached externally to the microprocessor because of the PC card interface, it takes more time to develop personal computers and portable data processing terminals The prolonged period of product development hampers these products from being reduced in manufacturing costs.

It is therefore an object of the present invention to provide a microprocessor that is easy and convenient to use. Another object of the invention is to provide a microprocessor which, when incorporated in a personal computer or like product equipped with the PC card interface, allows the computer to be designed in a reduced time and with fewer parts to be attached externally thereto, whereby the manufacturing cost of the computer as a whole is reduced.

These and other objects, features and advantages of the invention will become more apparent upon a reading of the following description and appended drawings.

The invention disclosed in this specification is outlined as follows: according to one aspect of the invention, there is provided a microprocessor to be incorporated in a personal computer, a portable data processing terminal or the like, the microprocessor being furnished with a bus state controller. The bus state controller BSC, connected to an external bus, controls parallelly the interfaces for various semiconductor memories such as a ROM, a burst ROM, an SRAM, a PSRAM, a DRAM and a synchronous DRAM, as well as for PC cards such as a memory card and an I/O card. The bus state controller BSC includes a control register (PCR) for controlling the time to set up PC card start signals (-OE, -WE) where a synchronous DRAM is connected.

Preferably, the inventive microprocessor has the address space of the external bus divided into a predetermined number of areas to which various semiconductor memories and PC cards are fixedly assigned. The address space areas are assigned independently two kinds of physical addresses: those in effect when the I/O card functions as an I/O device, and those used when the I/O card acts as a memory. The microprocessor is preferably equipped with a memory management unit for converting an internal logical address to a physical address applicable to the external bus.

The foregoing objects are attained through the use of the above-outlined means for the following reasons: the inventive microprocessor is free of constraints of physical address assignments and requires fewer parts to be attached externally thereto for interface control. As such, the microprocessor has various semiconductor memories and PC cards such as a memory card and an I/O card connected directly and concurrently to a bus external to the microprocessor. Consequently, the microprocessor becomes more convenient to use. When incorporated in a personal computer equipped with PC card interfaces, the microprocessor helps reduce the number of steps to design the computer. With its externally attached parts reduced in quantity, the microprocessor costs less to manufacture.

The bus state controller BSC has the control register (PCR) for controlling the time to set up PC card start signals (-OE, -WE) where the synchronous DRAM is connected. The control register arrangement makes it possible to control the fall of a clock signal CKIO for an output enable signal (-OE) and a write enable signal (-WE) used as the PC card start signals, and to control the time to set up address signals. As a result, even if a PC card and a synchronous DRAM are connected concurrently to the inventive microprocessor MPU, the microprocessor may access both the PC card and the DRAM with no difficulty.

BRIEF DESCRIPTION OF THE DRAWINGS

FIG. 10 is a partial table of typical signals used on the external bus shown in FIGS. 7 and 8;

FIG. 11 is another partial table of typical signals used on the external bus shown FIGS. 7 and 8;

FIG. 14 is a table of typical states applicable to the states of the bus state controller shown in FIG. 13;

FIG. 15 is a table of typical transition conditions for the bus state controller of FIG. 13;

DESCRIPTION OF THE PREFERRED EMBODIMENTS

Figure 1:
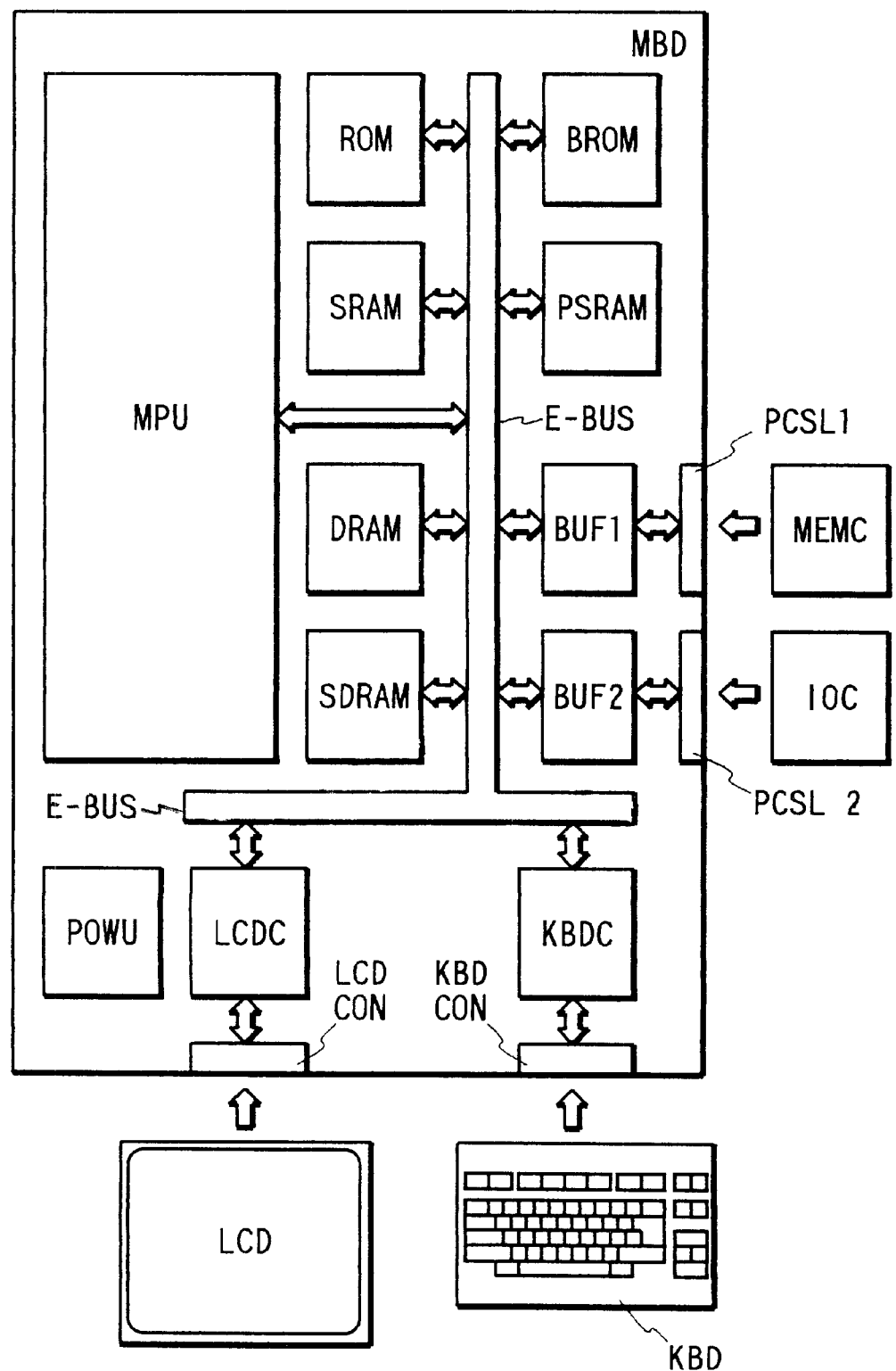
FIG. 1 is a system block diagram of a personal computer including a microprocessor practiced as an embodiment of the invention.

FIG. 1 is a system block diagram of a personal computer including a microprocessor MPU practiced as one preferred embodiment of the invention. In FIG. 1, one of the basic components of the personal computer is a mother board MBD incorporating the microprocessor MPU. Two PC cards, illustratively a memory card MEMC and an I/O card IOC, are connected to the mother board MEMC through PC card slots PCSL1 and PCSL2, respectively. A liquid crystal display LCD and a keyboard KBD constituting a man-machine interface are connected via connectors LCDCON and KBDCON respectively to the mother board MBD. The memory card MEMC may be composed of an SRAM (static RAM), an EPROM (electrically programmable read only memory), an EEPROM (electrically erasable programmable read only memory) or a flash EEPROM. The I/O card IOC may be made up of a modem for facsimile transmission and data transfer, a control circuit for use with a LAN, a control circuit for use with a global positioning system (GPS), or a small computer system interface controller.

The microprocessor MPU on the mother board MBD is connected illustratively to six semiconductor memories via an external bus E-BUS. These memories may be a ROM, a burst ROM (BROM), an SRAM, a PSRAM (pseudo RAM), a DRAM (dynamic RAM) and an SDRAM (synchronous DRAM). The external bus E-BUS is further connected to PC card buffers BUF1 and BUF2, a display controller LCDC, and a keyboard controller KBDC. The PC card buffers BUF1 and BUF2 are connected respectively to the PC card slots PCSL1 and PCSL2, i.e., to the memory card MEMC and I/O card IOC. The display controller LCDC and keyboard controller KBDC are coupled respectively to the connectors LCDCON and KBDCON, i.e., to the liquid crystal display LCD and keyboard KBD. The semiconductor memories, the PC card buffers and the controllers mounted on the mother board MBD are powered individually by a power supply unit POWU.

The microprocessor MPU operates in steps in accordance with programs read from the ROM or burst ROM, thereby carrying out logic operations and controlling the components of the personal computer. The PC card buffers BUF1 and BUF2 interface respectively to the memory card MEMC and I/O card IOC. The display controller LCDC and keyboard controller KBDC control respectively the liquid crystal display LCD and keyboard KBD coupled to the connectors LCDCON and KBDCON.

In this setup, the microprocessor MPU has a bus state controller BSC, to be described later, capable of controlling in parallel the interfaces to the semiconductor memories (ROM, burst ROM, SRAM, PSRAM, DRAM and synchronous DRAM) and to the PC cards (memory card MEMC and I/O card IOC). These memories and cards are all connected to the external bus E-BUS. The address space of the external bus E-BUS is divided into a predetermined number of areas to which the semiconductor memories and PC cards are fixedly assigned. In such areas, the physical addresses in effect when the I/O card functions as an I/O device are assigned independently of the physical addresses used when the IO card acts as a memory. To provide for this arrangement, the microprocessor MPU includes a memory management unit MMU that converts an internal logical address to a physical address applicable to the external bus. As a result, the microprocessor MPU is free of constraints of physical address assignments and requires fewer parts to be attached externally thereto for interface control. As such, the microprocessor MPU has various semiconductor memories and PC cards (memory card and I/O card) connected directly and concurrently to the external bus E-BUS. Consequently the microprocessor MPU becomes more convenient to use. When incorporated in a personal computer, the microprocessor MPU helps reduce the number of steps to design the computer. With its externally attached parts thus reduced in quantity, the microprocessor MPU allows the personal computer or the like to cost less to fabricate.

Figure 2:
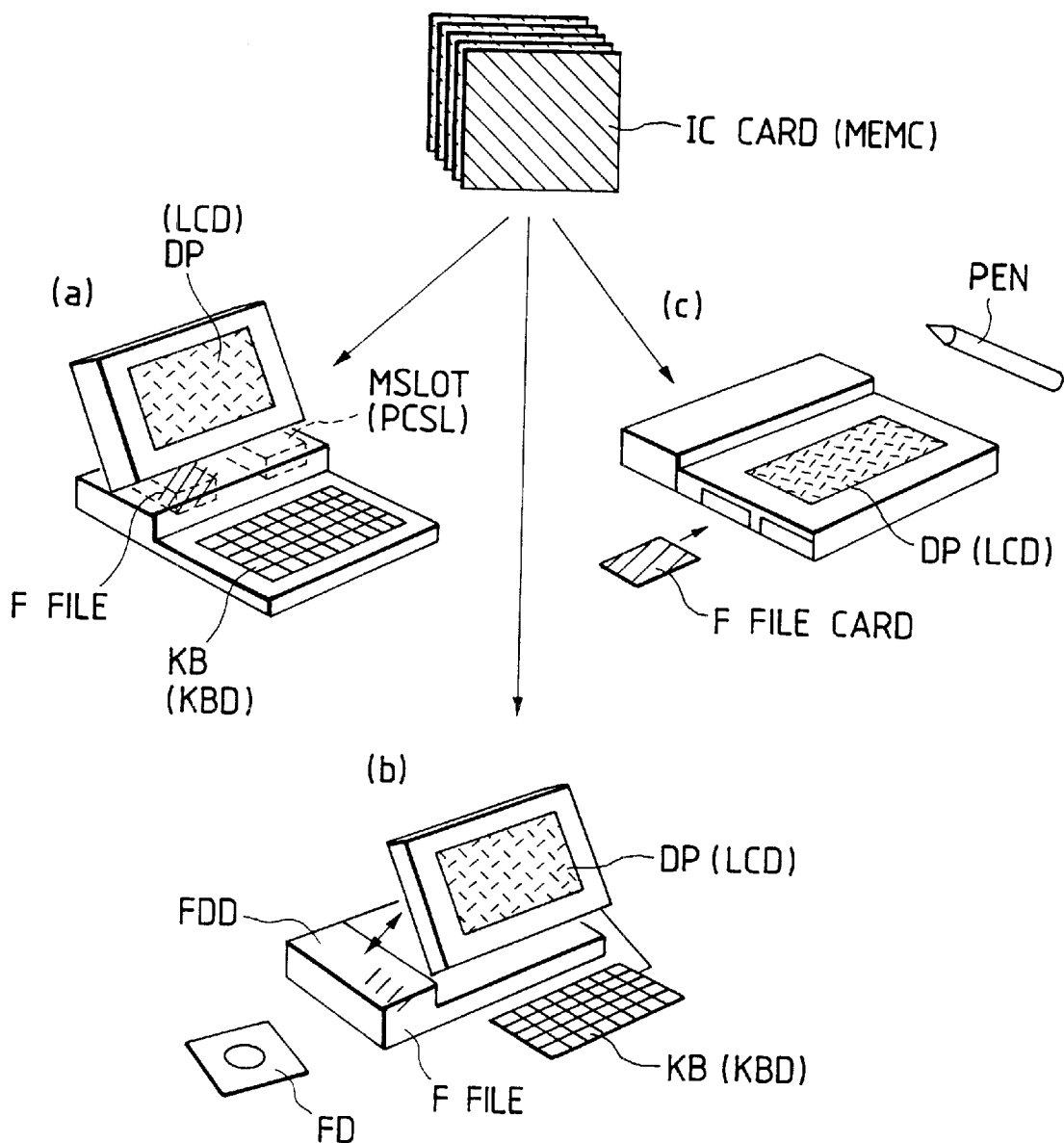
FIGS. 2(A), 2(B) and 2(C) are external views of the personal computer shown in FIG. 1.

FIGS. 2(A), 2(B) and 2(C) are external views of the personal computer of FIG. 1. The computer in FIG. 2(A) is a so-called notebook-sized personal computer with its PC card slots MSLOT (PCSL1, PCSL2) accommodating a memory card MEMC or an I/O card IOC incorporating a file Ffile. The computer also has a keyboard KB (KBD) and liquid crystal display DP (LCD) as I/O devices. The liquid crystal display may be folded onto the computer body for portable use.

The computer in FIG. 2(B) is a so-called desk-top type personal computer equipped with a floppy disc drive FDD and a memory card MEMC or an I/O card IOC accommodated in a PC card slot, not shown. The card incorporates a file Ffile. As its I/O devices, the desk-top type computer has a keyboard KB and a liquid crystal display DP. The floppy disc drive FDD has an appropriate floppy disc FD inserted therein. In this setup, the personal computer has two kinds of storage regions: a software-based storage region on the floppy disc FD, and a hardware-based storage region furnished by the file Ffile.

The computer in FIG. 2(C) is a so-called pen-portable type computer with two PC card slots for accommodating a memory card MEMC or an I/O card IOC, i.e., a file card Ffile CARD. As its I/O devices, the computer has a pressure-sensitive sheet equipped liquid crystal display DP and an input pen PEN for inputting scribbled characters.

With these computers, the microprocessor MPU on the mother board MBD has the interfaces for having various semiconductor memories and PC cards (memory card MEMC and I/O card IOC) interconnected directly and concurrently, as mentioned earlier. The arrangement simplifies the mother board MBD in structure as well as the personal computer that incorporates it. Downsized and lightweight, the resulting computer is easy to carry around, and has functions (e.g., burst function, to be described later) permitting large amounts of data to be input and output at high speeds. Such features allow the personal computer to process ever-increasing data more quickly and more conveniently than ever before.

Figure 3:
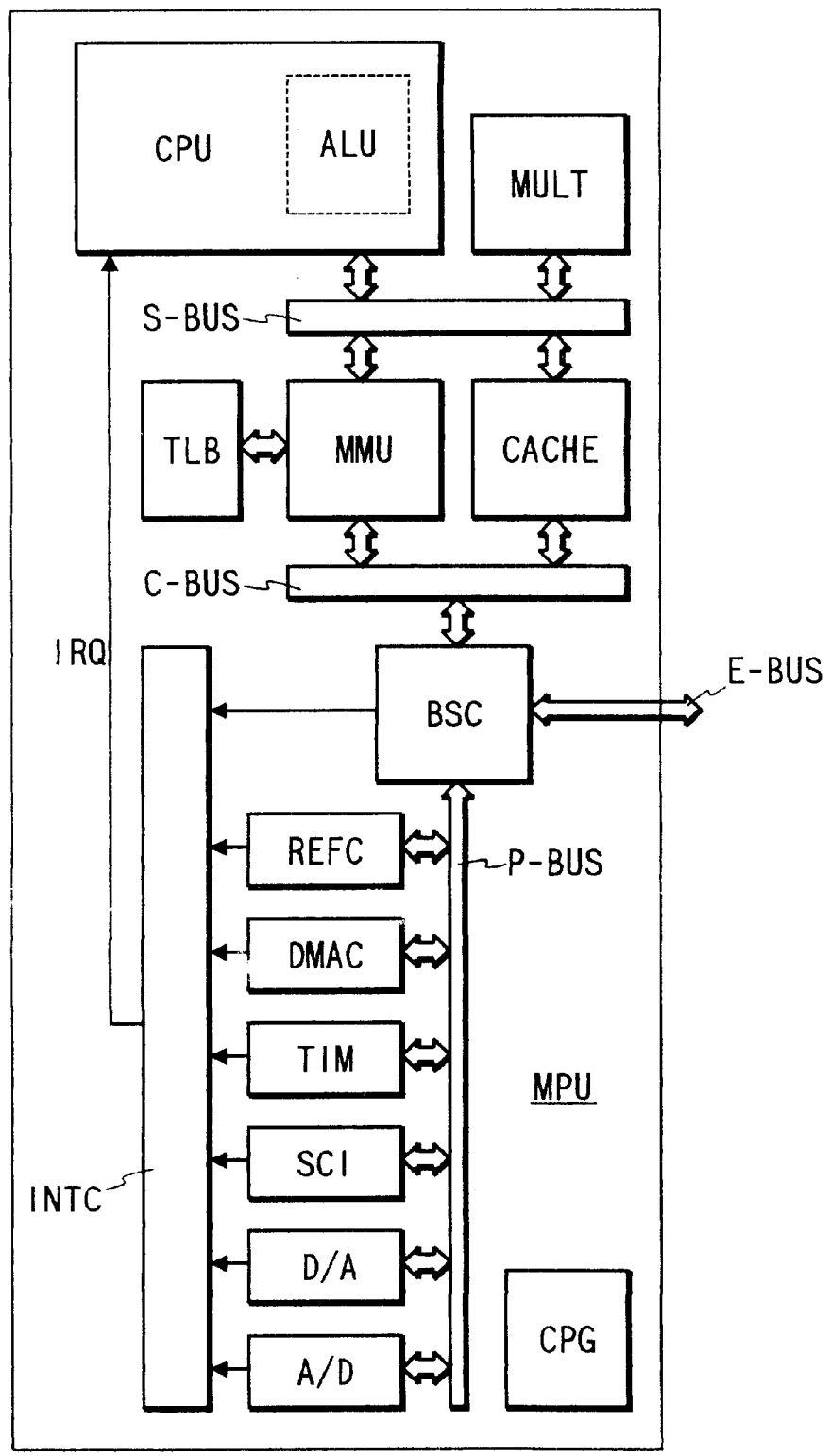
FIG. 3 is a block diagram of the embodiment included in the personal computer of FIG. 1.
Figure 4:
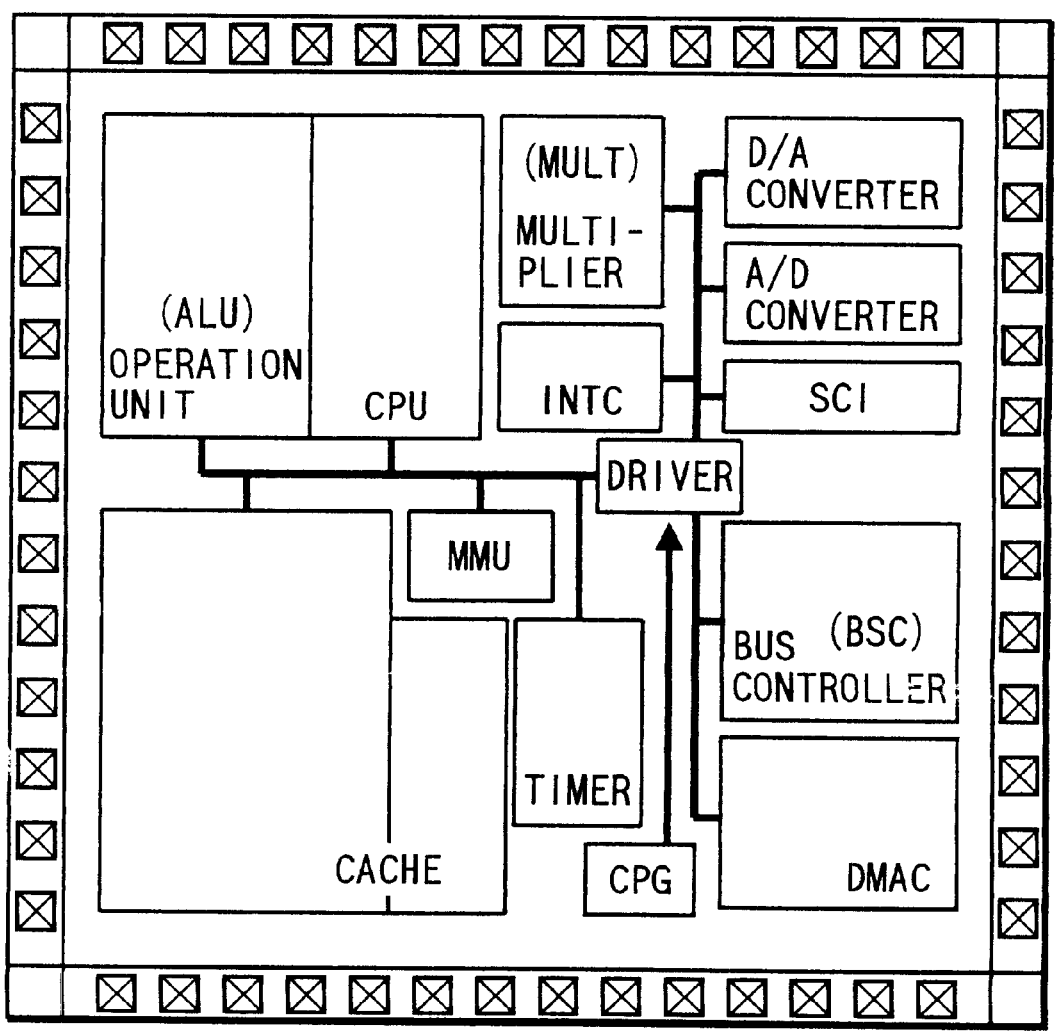
FIG. 4 is a substrate layout view of the embodiment in FIG. 3.

FIG. 3 is a block diagram of the microprocessor MPU embodying the invention and included in the personal computer of FIG. 1. FIG. 4 is a semiconductor substrate (semiconductor chip) layout view of the microprocessor MPU in FIG. 3. The microprocessor MPU is formed by known semiconductor fabrication techniques on a semiconductor substrate composed illustratively of single crystal silicon. One of the basic components of the microprocessor MPU in FIG. 3 is a stored-program type central processing unit CPU comprising an arithmetic and logic unit ALU. The central processing unit CPU is connected via a system bus S-BUS (first internal bus) to a multiplier MULT, a memory management unit MMU and a cache memory CACHE. The memory management unit MMU is coupled with an address translation buffer TLB. Furthermore, the memory management unit MMU and cache memory CACHE are connected to a cache bus C-BUS (second internal bus). The cache bus C-BUS is in turn connected to one end of a bus state controller BSC.

The other end of the bus state controller BSC is connected to a peripheral bus P-BUS, as well as to the external bus E-BUS via a bus interface and a bus connector, not shown. The peripheral bus P-BUS (third internal bus) is connected with such peripheral controllers as a refresh controller REFC, a direct memory access controller DMAC, a timer circuit TIM, a serial communication interface SCI, a digital-analog converter D/A and an analog-digital converter A/D. The external bus E-BUS is connected to the PC card buffers BUF1 and BUF2 for accommodating the above-mentioned various semiconductor memories and PC cards, to the display controller LCDC and to the keyboard controller KBDC. Furthermore, the bus state controller BSC, refresh controller REFC, direct memory access controller DMAC, timer circuit TIM, serial communication interface SCI, digital-analog converter D/A and analog-digital converter A/D are connected to an interrupt controller INTC. In turn, the interrupt controller INTC is coupled to the central processing unit CPU by use of an interrupt request signal IRQ.

Although not shown in FIG. 3, the system bus S-BUS, cache bus C-BUS and peripheral bus P-BUS are each, assumed to include an internal address bus for address signal transmission, an internal data bus for data transmission, and an internal control bus for control signal transmission. The external bus E-BUS is assumed to include an external address bus for address signal transmission, an external data bus for data transmission, and an external control bus for control signal transmission.

The central processing unit CPU operates in synchronism with a predetermined system clock signal from a clock pulse generator CPG. Acting in this manner, the central processing unit CPU performs appropriate operations in accordance with the control program read from the cache memory CACHE, and controls and supervises the components of the microprocessor MPU. At this point, the arithmetic and logic unit ALU carries out predetermined arithmetic and logic operations, while the multiplier MULT executes multiply or product-sum operations effective illustratively for digital signal processing. Upon access to memory, the memory management unit MMU converts to the corresponding physical address the logical address output from inside the microprocessor MPU, i.e., from the central processing unit CPU, by referring to the address translation buffer (address translation look-aside buffer) TLB. After address translation, the physical address is transmitted via the bus state controller BSC to outside of the microprocessor MPU, i.e., onto the external bus E-BUS. The cache memory CACHE is made up of a semiconductor memory that may be accessed at high speed. The control program or data is read in units of predetermined blocks from the external ROM or burst ROM and retained in the cache memory CACHE to provide for the high-speed operation of the central processing unit CPU.

Meanwhile, the bus state controller BSC controls and supervises the operation of the various peripheral controllers as they gain access to the peripheral bus P-BUS connected to them. The bus state controller BSC also controls and supervises the operation of the semiconductor memories and PC cards connected to the external bus E-BUS, as well as the operation of I/O controllers.

In this setup, the physical address space of the external bus E-BUS is divided illustratively into eight areas. Seven out of the eight areas are assigned fixedly and in a predetermined combination to the semiconductor memories and PC cards. The bus state controller BSC has a function to control and manage parallelly the timings of the control signals toward the semiconductor memories and PC cards assigned to the areas of the external bus E-BUS. Various control registers are included in the bus state controller BSC to designate the conditions for the timings selectively. As a result, the semiconductor memories including the ROM, burst ROM, SRAM PSRAM, DRAM and synchronous DRAM, as well as the PC cards including the memory card MEMC and I/O card IOC, are connected directly and concurrently to the external bus E-BUS. The composition of the signals applicable to the external bus E-BUS and a specific constitution of the bus state controller BSC will be described later in more detail.

The refresh controller REFC, one of the peripheral controllers, controls the refresh operation of the DRAM and SRAM connected to the external bus E-BUS. The direct memory access controller DMAC supports high-speed data transfer illustratively between the ROM or burst ROM coupled to the external bus E-BUS on the one hand, and the cache memory CACHE on the other. The timer circuit TIM supports time management necessary for the central processing unit CPU. The serial communication interface SCI supports serial data transfer between the microprocessor and an external communication controller. The analog-digital converter A/D converts the analog signal from an external sensor or the like into the corresponding digital signal. Conversely, the digital-analog converter D/A converts the digital signal from the central processing unit CPU into the corresponding analog signal for output to the outside.

The interrupt controller INTC accepts interrupt requests from the bus state controller BSC and peripheral controllers one by one and in a predetermined order of priority. Having accepted a specific interrupt request, the interrupt controller INTC transmits accordingly an interrupt request signal IRQ to the central processing unit CPU.

In this setup, the components constituting the microprocessor MPU are laid out on a single semiconductor substrate subject to certain layout conditions, as shown in FIG. 4. The components of the microprocessor MPU are each formed as a module. That is, desired modules ate selected and combined effectively into a microprocessor according to the user's specifications. In FIG. 4, the bus controller module corresponds to the bus state controller BSC and the timer module represents the timer circuit TIM. The system clock signal generated by the clock pulse generator CPG is distributed to the necessary parts of the microprocessor MPU via a clock driver (DRIVER in FIG. 4.).

Figure 5:
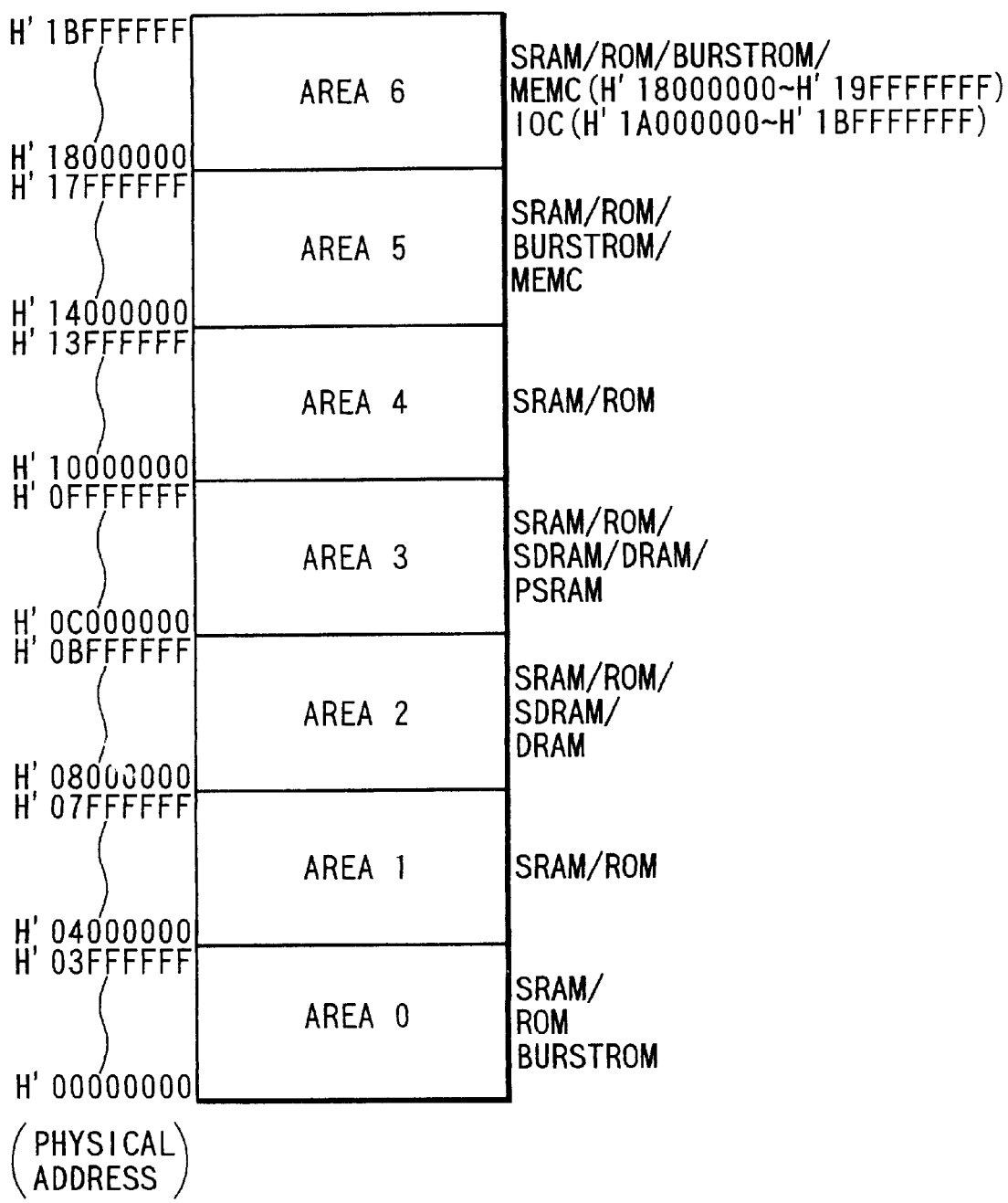
FIG. 5 is an address map showing a typical address space of a bus external to the embodiment of FIG. 3.
Figure 6:
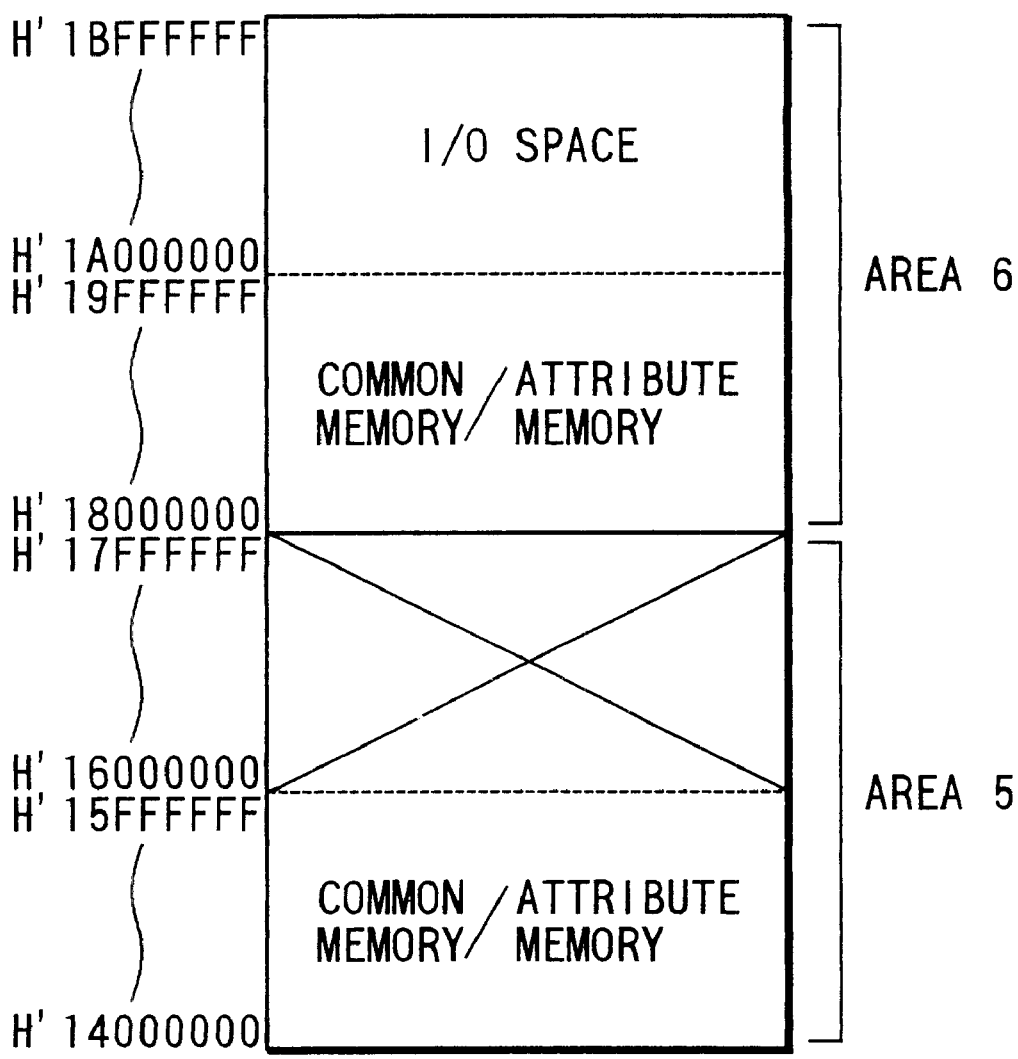
FIG. 6 is an address map showing address space areas 5 and 6 of the external bus for the embodiment of FIG. 3.

FIG. 5 is an address map showing how the address space of the external bus E-BUS is divided for the microprocessor MPU of FIG. 3. FIG. 6 is a partial address map showing address space areas 5 and 6 of the external bus in which physical addresses are illustratively assigned. In FIG. 5, the physical address space of the external bus E-BUS for the microprocessor MPU is divided illustratively into eight areas 0 through 7. Areas 0 through 6 are for use by the semiconductor memories and PC cards connected to the external bus E-BUS. Area 0 is assigned selectively to an ordinary memory, to be explained later, including the SRAM and ROM or to the burst ROM. Areas 1 and 4 are assigned selectively to the ordinary memory. Area 2 is assigned selectively to the ordinary memory, SDRAM or DRAM. Area 3 is assigned selectively to the ordinary memory, SDRAM, DRAM or PSRAM. Area 5 is assigned selectively to the ordinary memory, burst ROM or memory card MEMC. Area 6 is assigned selectively to the ordinary memory, burst ROM, memory card MEMC or I/O card IOC. In this specification, the ordinary memory refers to the so-called address non-multiplex type memory such as the SRAM and ROM accessed by having a row address and a column address supplied simultaneously, as opposed to the address multiplex type memory such as the DRAM and SDRAM accessed by having a row address and a column address supplied on a time division basis.

Area 7 is assigned the addresses of the components inside the microprocessor MPU, e.g., addresses of the internal registers of the CPU and those of the registers in the peripheral controllers. As such, area 7 is not to be used by any external device. Which semiconductor memory or PC card is to be connected to which of areas 0 through 6 is designated selectively by a bus control register BCR1, to be described later, of the bus state controller BSC.

In this setup, the system bus S-BUS, cache bus C-BUS and peripheral bus P-BUS of the microprocessor MPU have each an internal address bus comprising signal lines capable of transmitting 32-bit address signals A0 through A31. The logical addresses inside the microprocessor MPU constitute a 4 GB (gigabyte) address space, the logical addresses being designated alternatively by the address signals A0 through A31. The physical addresses for outside of the microprocessor MPU, i.e., for the external bus E-BUS, are designated alternatively by 29-bit address signals A0 through A28 which are short of three high-order bits. The three high-order bits, found in the address signals A0 through A31, are A26 trough A28 making up address signals for generating chip select signals -CS0 through -CS6 by which to designate areas 0 through 6 alternatively. Low-order 26 bits, A0 through A25, constitute an address signal for designating alternatively the address in each area. That is, the external address bus in the external bus E-BUS comprises signal lines capable of transferring the address signals A0 through A25.

As a result, area 0 is assigned physical addresses H'00000000 through H'03FFFFFF (H' stands for hexadecimal notation), and area 1 is assigned physical addresses H'04000000 through H'07FFFFFF. Areas 2, 3 and 4 are respectively assigned physical addresses H'08000000 through H'0BFFFFFF, H'0C000000 through H'0FFFFFFF, and H'10000000 through H'13FFFFFF. Areas 5 and 6 are respectively assigned physical addresses H'14000000 through H'17FFFFFF and H'18000000 through H'1BFFFFFF. The address assignments allow each area to possess a physical address space of 64 MB (megabytes). Adding H'20000000×n (n=1–6) to each of the physical addresses in areas 0 through 6 provides a shadow space of each area. The multiplier n is designated selectively by high-order three bits of the logical address, i.e., by the address signals A29 through A31.

The physical addresses of areas 5 and 6 assigned to the memory card MEMC and I/O card IOC are further divided into two regions in each area, as shown in FIG. 6. In area 5, the low-order region of addresses H'14000000 through H'15FFFFFF is allocated as a common memory or attribute memory for use by the memory card MEMC, while the high-order region of addresses H'16000000 through H'17FFFFFF is inhibited from use. In area 6, the low-order region of addresses H'18000000 through H'19FFFFFF is allocated as a common memory or attribute memory used when the memory card MEMC or I/O card IOC acts as a memory, whereas the high-order region of addresses H'1A000000 through H'1BFFFFFF serves as an I/O region used when the IO card IOC functions as an I/O device. Consequently, the common memory or attribute memory in areas 5 and 6 constitutes a 32-MB address space each.

Illustratively, one of the two regions in area 6 is designated selectively by an address signal A25 for use with the I/O card IOC functioning as a memory or as an I/O device. The 32-MB address space is designated alternatively by an address signals of the remaining 25 bits, A0 through A24. As is known in the art, the PCMCIA standards permit the PC card to have an address space of up to 64 MB. In that case, the most significant bit address signal A25 is also output over a separate channel via an output port of the microprocessor MPU, as will be discussed later. Because the physical address space of area 6 is divided into two regions so that either region may be selected by the address A25, the I/O card IOC connected to area 6 is switched dynamically by program execution to one of two functions: as a memory or as an I/O device. This feature enhances the availability of the microprocessor MPU.

As described, the physical address space of the microprocessor MPU is divided into eight areas, and seven out of the eight areas are assigned fixedly to the semiconductor memories and PC cards connected to the external bus E-BUS of the microprocessor MPU. From the user's point of view, this arrangement may appear to impose constraints on the software-based allocation of logical addresses. However, the microprocessor MPU of the invention incorporates the memory management unit MMU whose internal logical addresses corresponding to the physical addresses of the external bus E-BUS are readily altered by updating the address translation buffer TLB. Specifically, the address translation table TLB held in an external memory (e.g., DRAM) connected to the external bus E-BUS contains logical-physical address correspondence pairs that are easily updated as needed to alter the desired logical addresses. This feature frees the user from the constraints of physical addresses applicable to the external bus E-BUS, whereby a program having a freely designed logical address space is written as desired.

Figure 7:
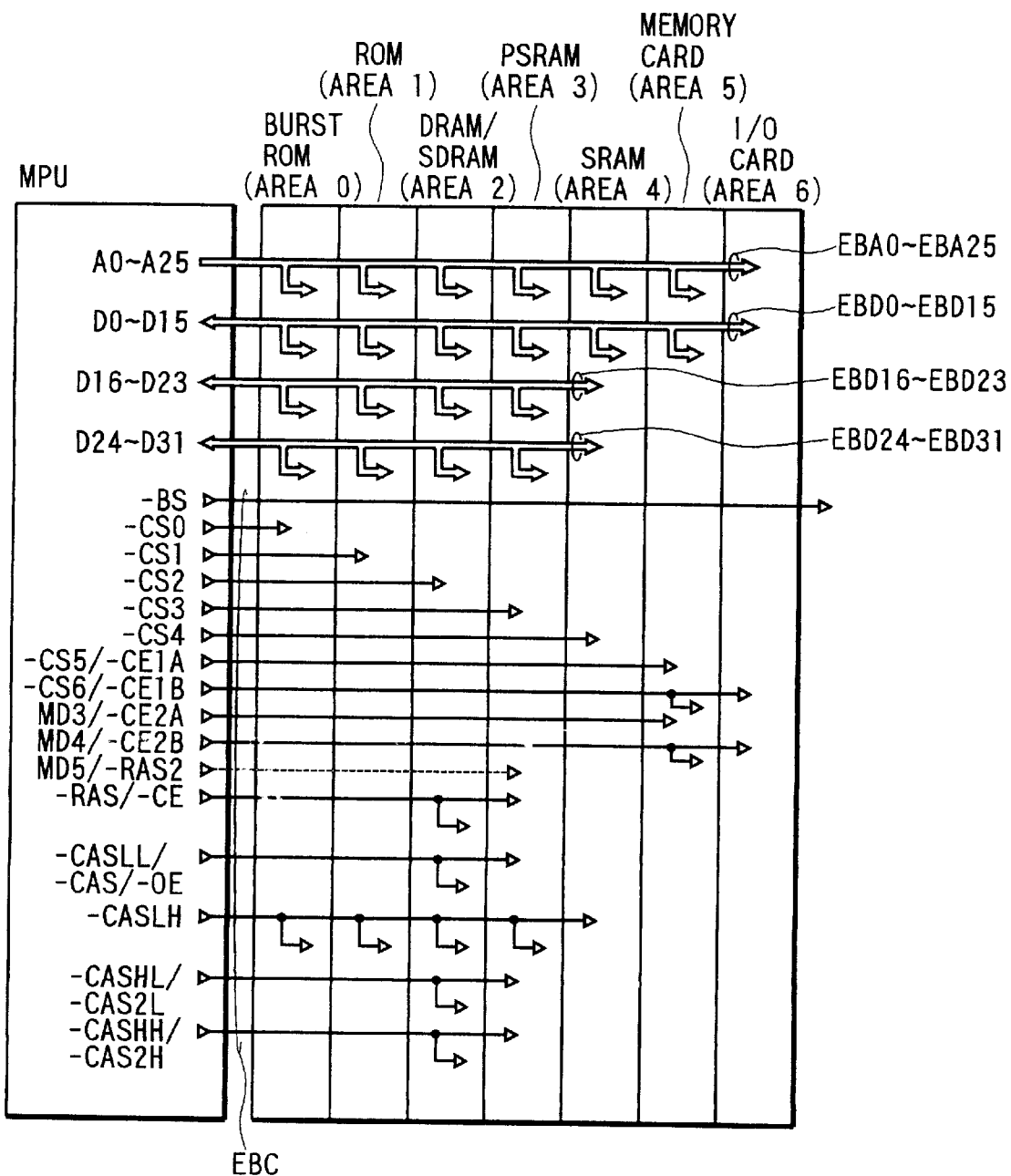
FIG. 7 is a connection diagram partially showing typical connections of the external bus to the embodiment of FIG. 3.
Figure 8:
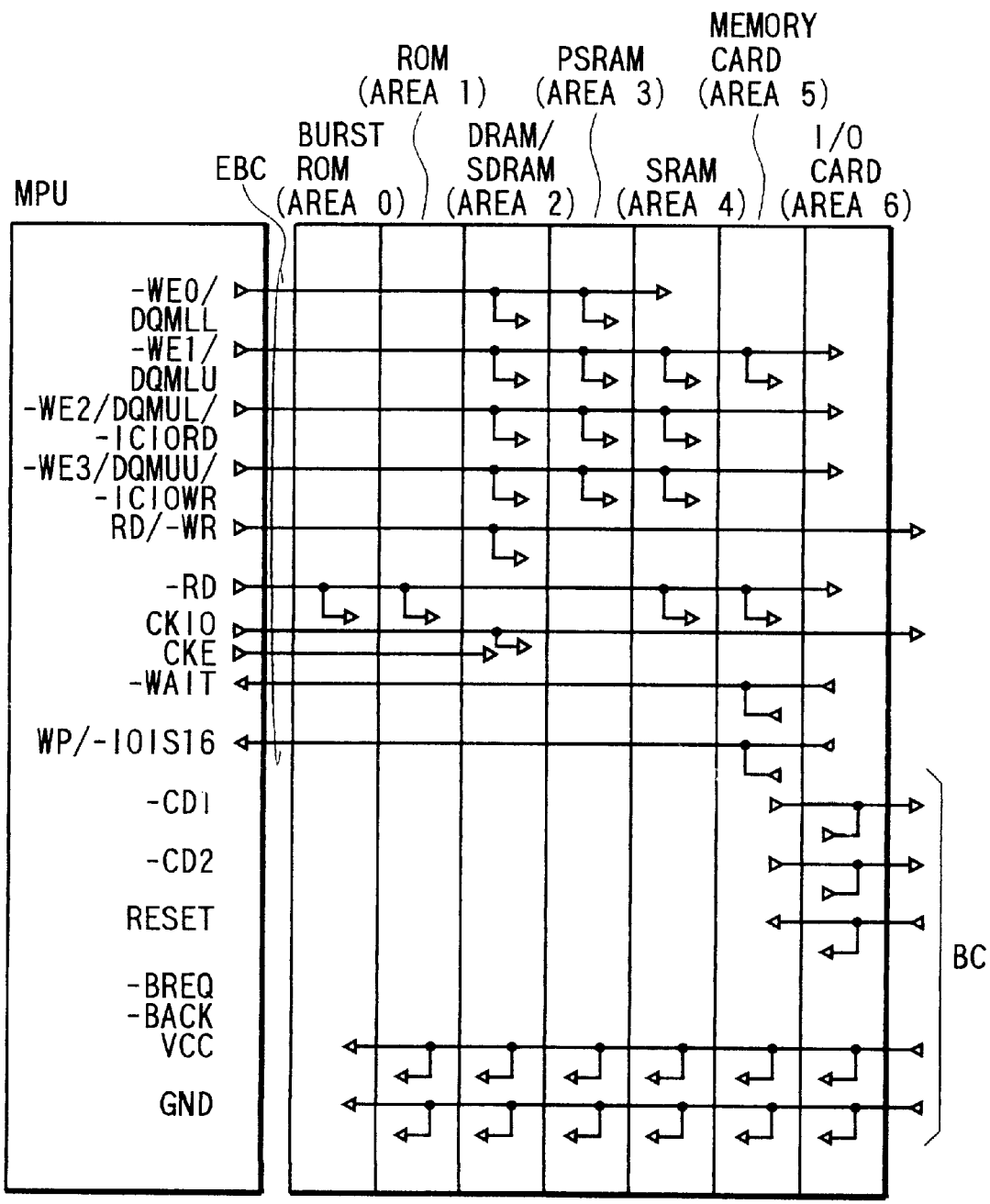
FIG. 8 is another connection diagram partially showing typical connections of the external bus to the embodiment of FIG. 3.
Figure 9:
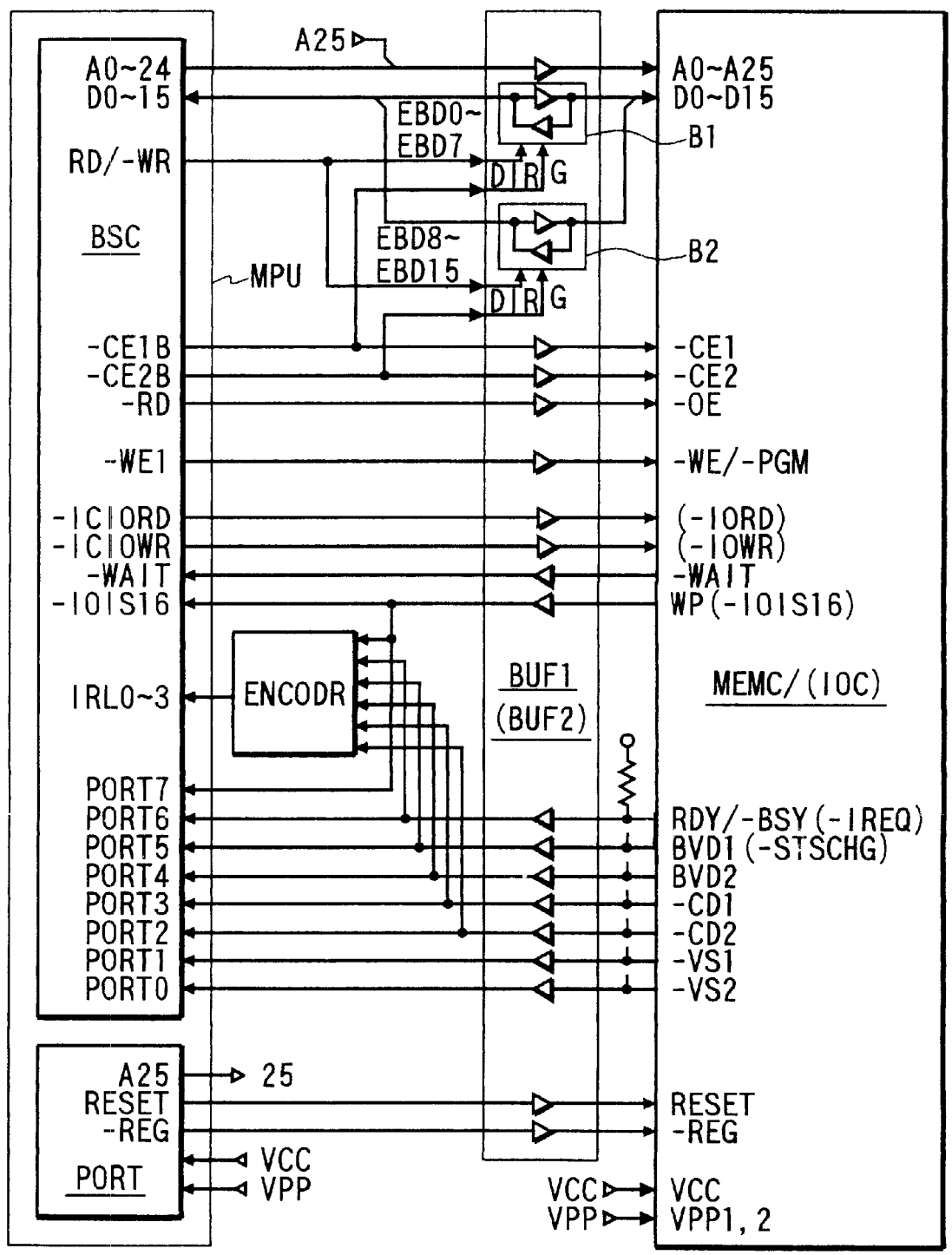
FIG. 9 is an interface block diagram of an interface example in which a PC card is connected to the external bus shown in FIGS. 7 and 8.

FIGS. 7 and 8 are connection diagrams showing typical connections of the external bus to the microprocessor MPU of FIG. 3. FIG. 9 is an interface block diagram of an interface example in which a PC card is connected to the external bus E-BUS shown in FIGS. 7 and 8. FIGS. 10 and 11 are tables of typical signals used on the external bus shown FIGS. 7 and 8. Although FIGS. 7 and 8 show the semiconductor memories to be assigned to areas 0 through 4 more or less arbitrarily, the combination of the memories is sometimes limited in practice depending on the area. FIGS. 10 and 11 should be referred to as needed while the arrangements in FIGS. 7 through 9 are discussed below.

In FIG. 7, the external bus E-BUS has a 26-bit external address bus EBA0–EBA25 and a 32-bit external data bus EBD0–EBD31 functioning as an address output bus and an I/O bus, respectively, from the point of view of the microprocessor MPU. The address bus EBA0–EBA25 transmits the address signals A0 through A25 commonly to all areas to which the semiconductor memories and PC cards are connected. The external data bus EBD0–EBD31 is connected selectively depending on the bus size of the semiconductor memories and PC cards coupled to the external bus E-BUS. The address input terminals of the DRAM and SDRAM are connected to a predetermined number of signal lines in the external address bus EBA0–EBA25, because the row and column addresses to the memory are fed to the same lines within the address bus on a time division basis.

The microprocessor MPU embodying the invention uses a bus control register BCR2, to be described later, of the bus state controller BSC to designate the bus size for each of areas 0 through 6. For area 0, any one of the byte size (8 bits), word size (16 bits) and long word size (32 bits) may be selected as the bus size. For each of areas 1 through 6, the byte, word or long word size may be selected if the area in question is assigned to the SRAM, ROM or burst ROM; if the area is assigned to the SDRAM, DRAM or PSRAM, then either the word or the long word size is selected as the bus size in combination with a memory control register MCR1. Where areas 2 and 3 are assigned to the DRAM, the selectable bus size is the word size only. If areas 5 and 6 are assigned to the PC card, either the byte or the word size is selected as the bus size.

In the manner described, the low-order 16-bit data bus lines EBD0 through EBD15 are connected to all semiconductor memories and PC cards assigned to areas 0 through 6. High-order 16-bit data bus lines EBD16 through EBD23 and EBD24 through EBD31 are connected selectively depending on the bus size for each area. Eight-bit data bus lines EBD16 through EBD23 may also be used as general-purpose ports PORT0 through PORT7 on condition that the bus size for the area in question is to be 16 bits or less, as will be explained later. In this case, a port function enable bit of the bus state controller BSC2 is set to a logical 1.

The external bus E-BUS comprises, as an external control bus EBC, control signal lines for transmitting a bus start signal -BS indicating that the data on the external bus E-BUS is valid (a hyphen (-) prefixed to a signal name denotes hereunder that the signal is an inverted signal that is selectively brought Low when made valid). The signal -BS is converted by the bus state controller BSC into start signals required by the semiconductor memories and PC cards. For this reason, the bus start signal -BS is supplied to the I/O controllers having bus management functions such as the display controller LCDC and keyboard controller KBDC, but not to the semiconductor memories and PC cards having no bus management functions.

The external control bus EBC of the external bus E-BUS includes two kinds of control signal lines: control signal lines for transmitting the chip select signals -CS0 through -CS6 by which to designate areas 0 through 6 alternatively, and control signal lines for transmitting mode signals MD3 through MD5 by which to designate the bus size and endian of area 0. The chip select signals -CS5 and -CS6 double respectively as card enable signals -CE1A and -CE1B corresponding to the PC cards connected to areas 5 and 6. The mode signals MD3 and MD4 double as card enable signals -CE2A and CE2B for these PC cards. The mode signal MD5 doubles as a row address strobe signal -RAS2 corresponding to a second-set DRAM connected to area 3.

The external control bus EBC of the external bus E-BUS has another three kinds of control signal lines: control signal lines for transmitting a row address strobe signal -RAS providing a start control signal to each of the semiconductor memories and PC cards; control signal lines for transmitting column address strobe signals -CASLL, -CASLH, -CASHL and -CASHH; and control signal lines for transmitting write enable signals -WE0 through -WE3, a read/write status signal RD/-WR, a read control signal -RD, an I/O clock signal CKIO, and a clock enable signal CKE. The I/O clock signal CKIO represents a system clock signal input to the microprocessor MPU or an operation clock signal fed to an SDRAM if that memory is connected. Given the I/O clock signal CKIO, the microprocessor MPU controls the timings of various I/O signals.

The row address strobe signal -RAS, supplied as such to the DRAM and SDRAM, doubles as a chip enable signal -CE toward the PSRAM connected to area 3. The column address strobe signals -CASLL, -CASLH, -CASHL and -CASHH are supplied as such to a 32-bit bus size DRAM over data bus lines D0–D7, D8–D15, D16–D23 and D24–D31, respectively. Of these column address strobe signals, the signal -CASLL doubles as a column address strobe signal -CAS to the SDRAM or as an output enable signal -OE to the PSRAM. The column address strobe signals -CASHL and -CASHH double as byte-based column address strobe signals -CAS2L and -CAS2H to the second-set DRAM.

The write enable signals -WE0 through -WE3 are supplied to the 32-bit bus size SRAM and PSRAM or SDRAM as write enable signals or data control signals DQMLL, DQMLU, DQMUL and DQMUU corresponding to data bus lines EBD0–EBD7, EBD8–EBD15, EBD16–EBD23, and EBD24–EBD31, respectively. The write enable signal -WE2 doubles as an I/O read control signal -ICIORD to the I/O card IOC connected to area 6. The write enable signal -WE3 doubles as an I/O write control signal ICIOWR. The read/write status signal RD/-WR is supplied as a write enable signal -WE to the DRAM and SDRAM, and doubles as a read/write signal R/-W to an I/O controller, not shown. The read control signal -RD is supplied as an output enable signal -OE to the ROM and SRAM as well as to the memory card MEMC and I/O card IOC. The I/O clock signal CKIO and clock enable signal CKE are fed to the SDRAM.

In this setup, the external bus E-BUS has another two kinds of control signal lines: control signal lines working as external input bus lines dedicated to PC card used to transmit a write protect signal WP; and control signal lines for transmitting a wait control signal -WAIT, bus request signal -BREQ, and a bus acknowledge signal BACK for bus control. Of these signals, the write protect signal WP is input selectively from a memory card MEMC that needs to be protected against write operations. The write protect signal WP also doubles as a 16-bit I/O port signal -IOIS16 notifying the microprocessor MPU that the bus size of the I/O card IOC is 16 bits. The wait control signal -WAIT is selectively input as needed from a PC card or an I/O controller requiring the microprocessor MPU to wait in cycles. The bus request signal -BREQ is selectively input as needed from a bus master that wants to monopolize the external bus E-BUS. The bus acknowledge signal BACK is output by the microprocessor MPU as a bus use enable signal to the bus master. The write enable signal -WE1 output by the microprocessor MPU is sent to the PC cards as a write enable signal -WE/-PGM. It should be noted that none of the semiconductor memories and PC cards shown in FIG. 8 functions as a bus master.

There are also provided (not included in the external bus E-BUS) two more sets of signal lines connected to the memory card MEMC and I/O card IOC. One set of signal lines supplies the PC card slots PCSL1 and PCSL2 respectively with card detection signals -CD1 and -CD2 each indicating the installation of a PC card in the slot in question. The other set of signal lines transmits a reset signal RESET. These control signals are detected by a board controller BC attached to the mother board MBD for board control purposes. The mother board MBD also has terminals for receiving a grounding potential GND and a supply voltage VCC used as an operating power supply. The supply voltage and grounding potential are distributed via a pair of power supply lines to the semiconductor memories, PC cards and I/O controllers as well as to the microprocessor MPU.

The PC cards such as the memory card MEMC and I/O card IOC are connected to the external bus E-BUS via the PC card buffers BUF1 and BUF2, as mentioned above. The address signal A25 is furnished to determine whether the I/O card IOC connected to area 6 is to function as a memory or as an I/O device. Thus if the memory card MEMC and I/O card IOC have a 64-MB address space, the address signal A25 is again output via a port unit PORT of the microprocessor MPU in order to select the highest-order address, as shown in FIG. 9. The port unit PORT also handles the reset signal RESET and an attribute memory space selection signal -REG. The mother board MBD includes an encoder unit ENCODER for setting interrupt levels IRL0 through IRL3. Needless to say, these signals are all based on the PCMCIA standards. As depicted in FIG. 9, the PC card buffer BUF1 or BUF2 includes a bidirectional buffer B1 connected to the external data bus lines EBD0 through EBD7 and a bidirectional buffer B2 attached to the external data bus lines EBD8 through EBD15. The data transmission direction (DIR) for each of the bidirectional buffers B1 and B2 is controlled by the read/write status signal RD/-WR. The gating operation (G) of each of the bidirectional buffers B1 and B2 is controlled by the card enable signals -CE1B and -CE2B.

Figure 12:
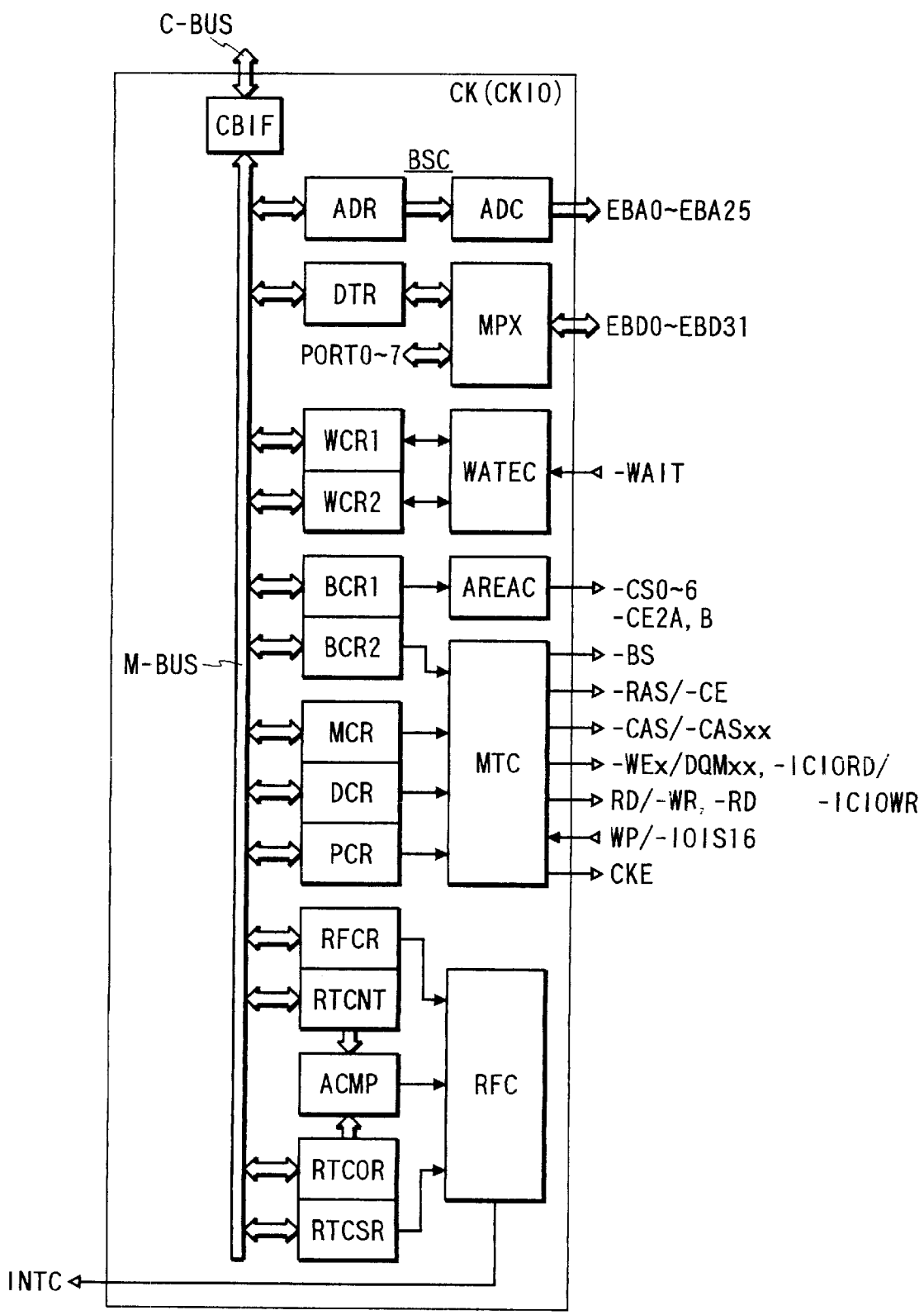
FIG. 12 is a block diagram of a bus state controller included in the microprocessor of FIG. 3.

FIG. 12 is a block diagram of the bus state controller BSC included in the microprocessor MPU of FIG. 3. In FIG. 12, the bus state controller BSC has a cache bus interface CBIF connected to the cache bus C-BUS of the microprocessor MPU. Also included in the bus state controller BSC are an address register ADR, a data register DTR, wait control registers WCR1 and WCR2, bus control registers BCR1 and BCR2, a memory control register MCR, a DRAM control register DCR, a PCMCIA control register PCR, a refresh counter register RFCR, a refresh timer count register RTCNT, a refresh time constant register RTCOR, and a refresh timer control status register RTCSR, all connected to the cache bus interface CBIF via a module bus M-BUS in the bus state controller BSC. The contents of these registers are updated as desired by the central processing unit CPU of the microprocessor MPU, i.e., by the programs contained therein. Specifically, the central processing unit CPU writes data to, and changes the contents in, each of the registers (ADR, DTR, WCR1, WCR2, BCR1, BCR2, MCR, DCR, PCMCIA, PCR, RFCR, RTCNT, RTCOR and RTCSR) by way of the cache bus C-BUS, cache bus interface CBIF and module bus M-BUS. The clock driver DRIVER supplies the bus state controller BSC with the operation clock signal CK generated by the clock pulse generator CPG shown in FIG. 4, the clock signal CK being used to determine the operation timings of the bus state controller BSC. The clock signal CK has the same frequency as that of the operation clock signal, for the central processing unit CPU, and is output as the system clock signal through the system clock I/O terminal CKIO to outside of the microprocessor MPU. As will be described later, the system clock signal output from the system clock I/O terminal CKIO is used as the operation clock signal of the synchronous DRAM.

The address register is connected to an address controller ADC. The output terminal of the data register DTR is connected to one input terminal of a multiplexer MPX. The other input terminal of the multiplexer MPX is connected to the ports PORT0 through PORT7. The wait control registers WCR1 and WCR2 are connected to a wait controller WATEC. The bus control register BCR1 is coupled to an area controller AREAC. The bus control register BCR2, memory control register MCR, DRAM control register DCR and PCMCIA control register PCR are connected to a memory timing controller MTC. The refresh count register RFCR, refresh timer count register RTCNT, refresh time constant register RTCOR and refresh timer control status register RTCSR are coupled to the refresh controller RFC.

The output terminal of the address controller ADC is connected to the address bus lines EBA0 through EBA25 of the external bus E-BUS, and the output terminal of the multiplexer MPX are connected to the data bus lines EBD0 through EBD31. The output signal of the wait controller WATEC becomes the wait control signal -WAIT, and the output signal of the area controller AREAC turns into the chip select signals -CS0 through -CS6 and card enable signals -CE2A and -CE2B. The output signals of the memory timing controller MTC are: the bus start signal -BS, row address strobe signal -RAS doubling as chip enable signal -CE, column address strobe signal -CAS/-CASxx (the suffix "xx" generically represents hereunder variations of, say, the column address strobe signal such as -CASLL, -CASLH, -CASHL and -CASHH), write enable signal -WEx doubling as data control signal DQMxx, I/O read control signal -ICIORD doubling as I/O write control signal -ICIOWR, read/write status signal RD/-WR, read control signal -RD, write protect signal WP doubling as 16-bit I/O port signal -IOIS16, and clock enable signal CKE.

The address-controller ADC transmits the address signals A0 through A25 coming from the address bus of the cache bus C-BUS to the address bus lines EBA0 through EBA25 of the external bus E-BUS. Furthermore, the address controller ADC has an address generating function to update automatically certain bits of the address signals in burst mode in which a series of addresses are accessed consecutively. The multiplexer MPX connects the cache bus C-BUS with the data bus lines EBD0 through EBD31 of the external bus E-BUS. Where certain bits of the data bus (i.e., data bus lines EBD16 through EBD23) are used as the ports PORT0 through PORT7, the multiplexer MPX performs the switching between data bus function and port function. As outlined, the bus state controller BSC incorporates the address controller ADC having the address generating function for use in burst mode. Thus the semiconductor memories and PC cards having burst mode are connected to the microprocessor with no increase in the number of parts to be externally attached to the latter, and the memories and cards may be accessed consecutively at high speed.

The wait controller WATEC supplies the microprocessor MPU with a cycle wait request sent from a PC card or an I/O controller using the wait signal -WAIT over the external bus E-BUS. On the basis of the constants written in the wait control registers WCR1 and WCR2, the wait controller WATEC selectively executes the insertion of idle cycles upon switching from read to write access or the insertion of a wait state for each of the areas.

The area controller AREAC selectively generates the chip select signals -CS0 through -CS6 and card enable signals -CE2A and CE2B in accordance with the assignment attributes written in the bus state control register BSC1 regarding areas 0 through 6 and on the basis of the area selection signal fed via the address bus lines A26 through A28 of the cache bus C-BUS. The memory timing controller MTC selectively generates under predetermined timing conditions the start control signals needed to control the operation of the semiconductor memories and PC cards. The selective generation of the start control signals is carried out on the basis of the bus size attributes written in the bus control register BCR2 regarding areas 0 through 6 and in accordance with the constants written in the memory control register MCR, DRAM control register DCR and PCMCIA control register PCR. The refresh controller RFC controls the refresh operation on the DRAM, SDRAM, etc., by making use of an overflow interrupt function of the refresh counter.

Figure 13:
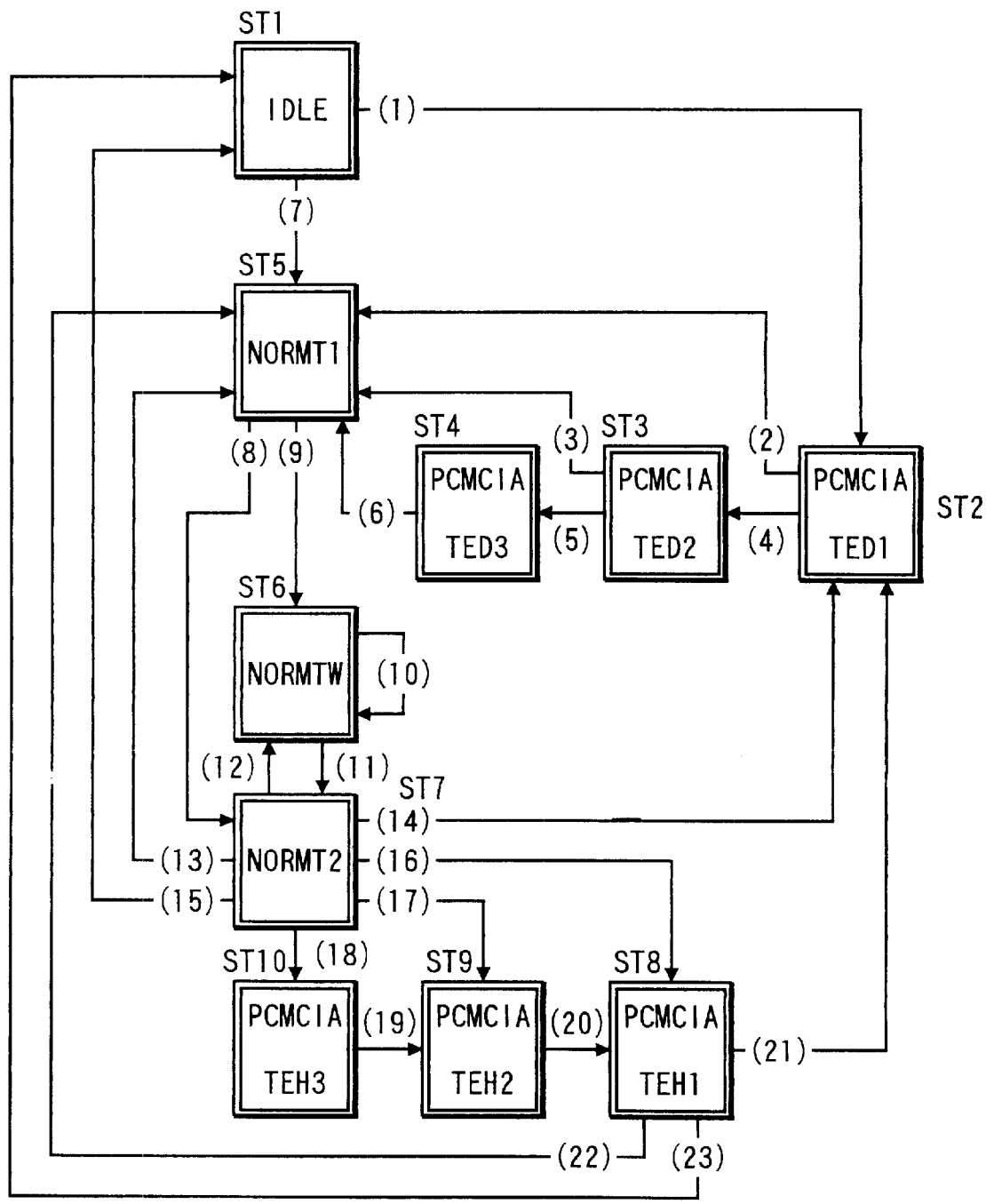
FIG. 13 is a state transition diagram applicable to the bus state controller of FIG. 12.
Figure 16:
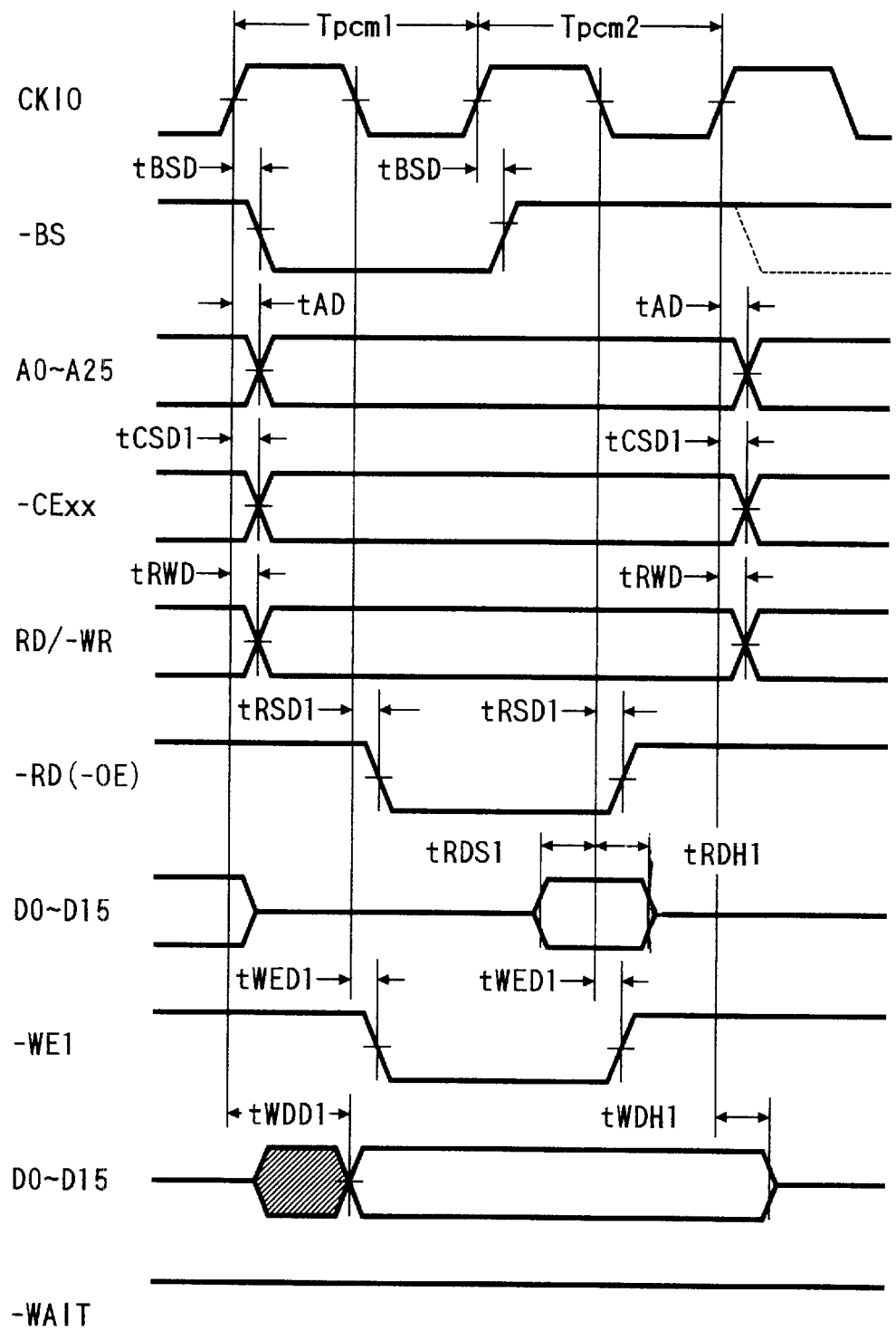
FIG. 16 is a signal waveform view showing typical signal waveforms in effect when the memory card is accessed by the microprocessor of FIG. 3 not entailing wait state.
Figure 17:
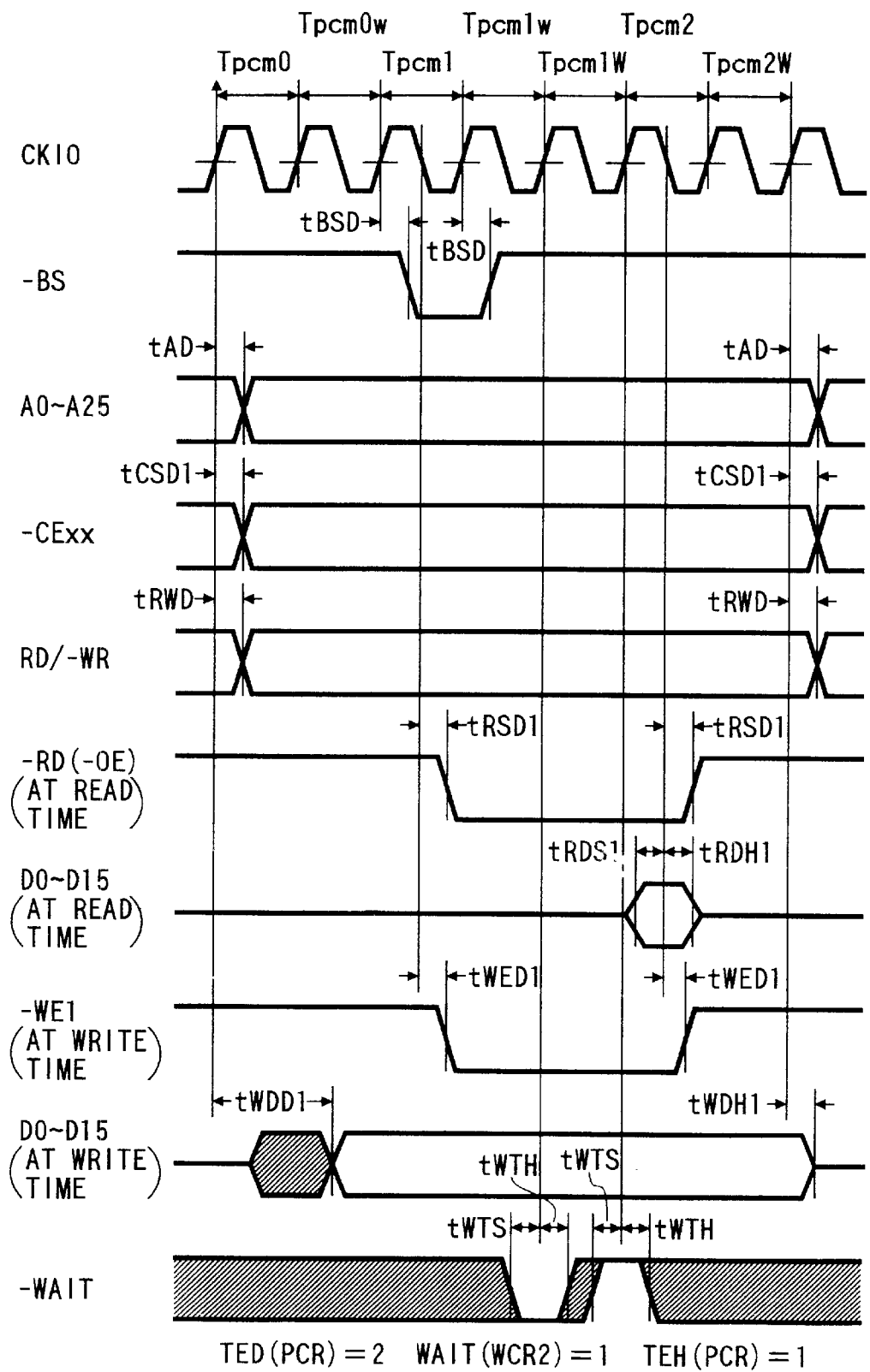
FIG. 17 is a signal waveform view showing typical signal waveforms in effect when the memory card is accessed by the microprocessor of FIG. 3 entailing wait state.
Figure 18:
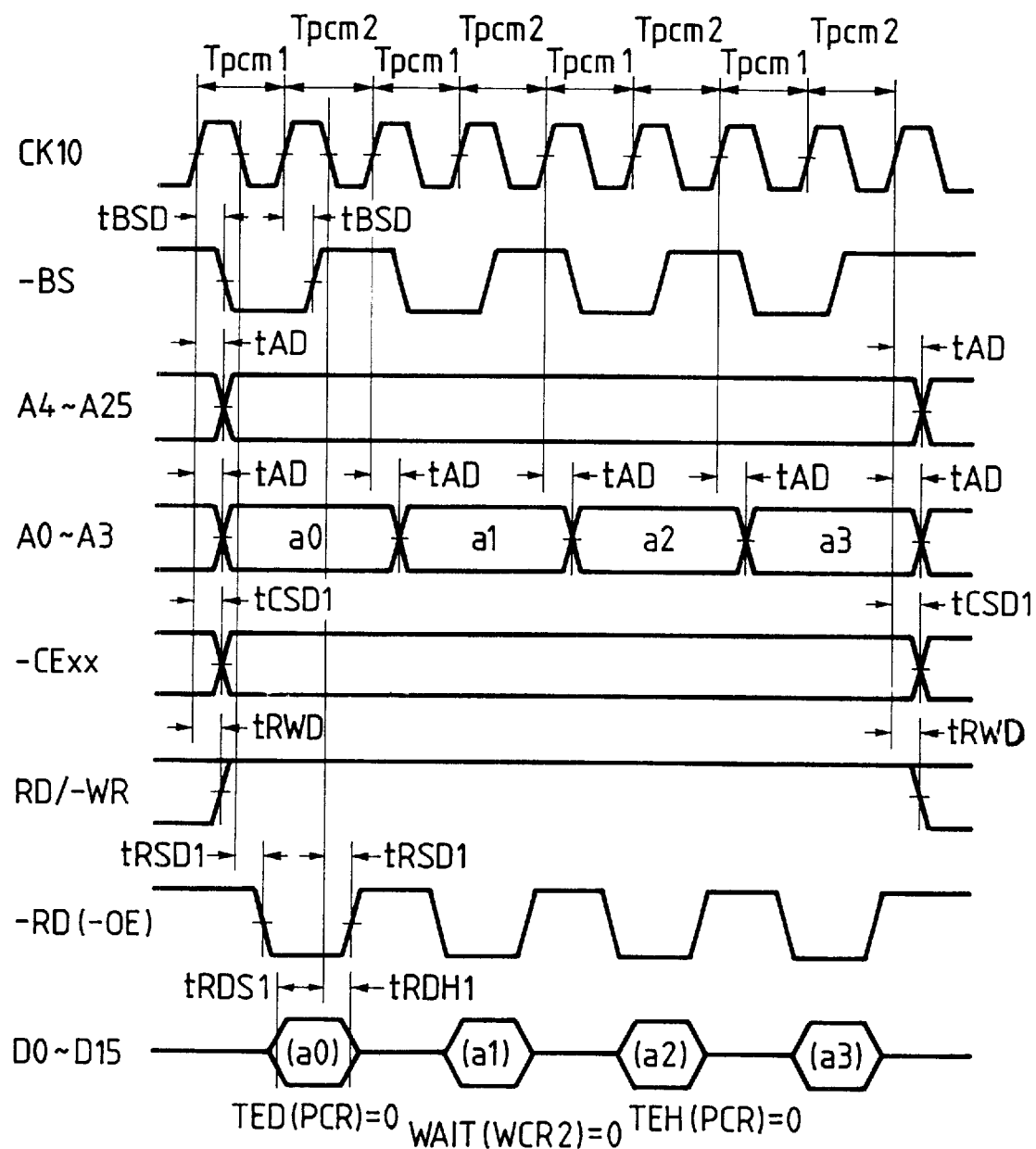
FIG. 18 is a signal waveform view showing typical signal waveforms in effect when the memory card is accessed by the microprocessor of FIG. 3 in burst mode.
Figure 19:
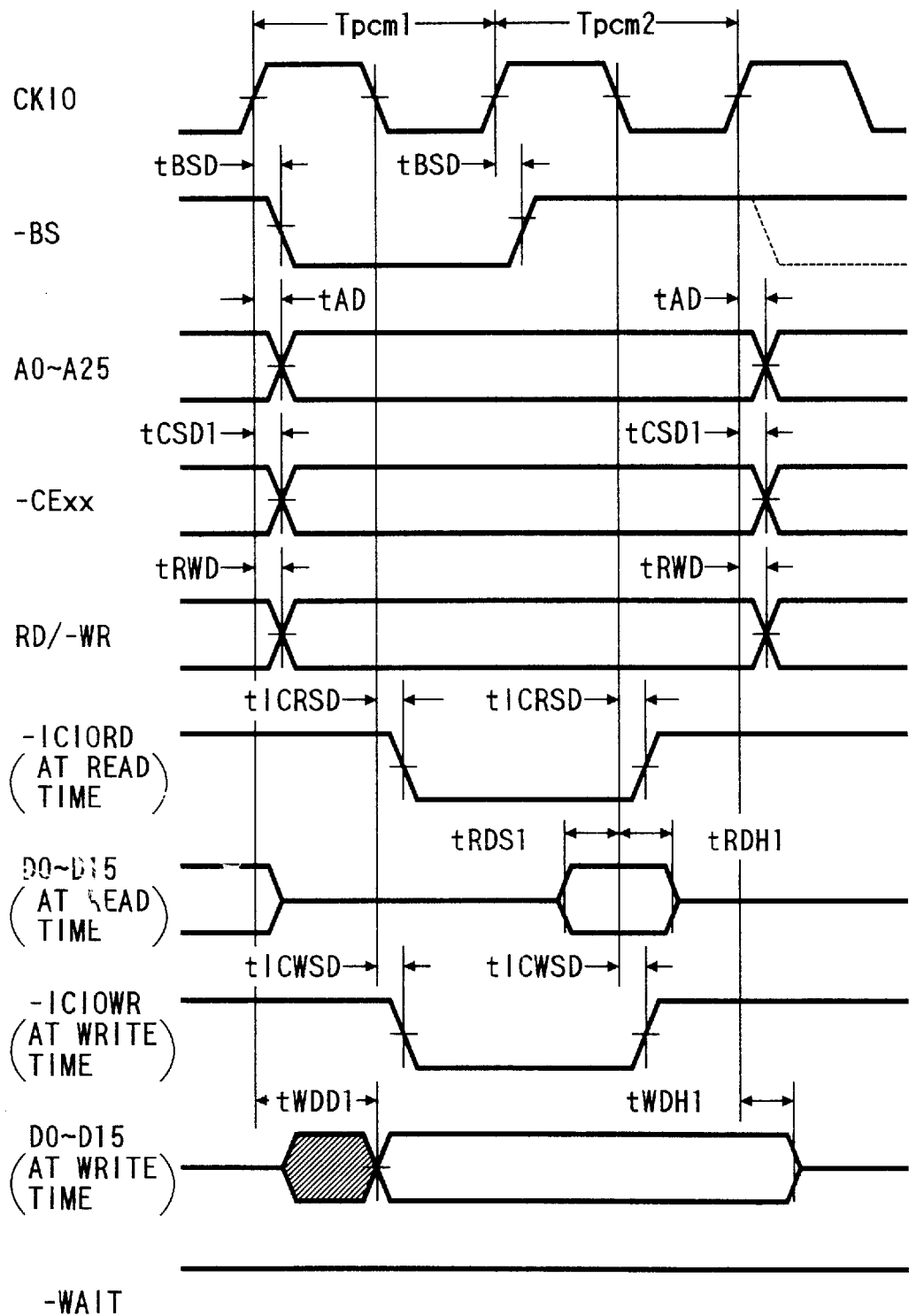
FIG. 19 is a signal waveform view showing typical signal waveforms in effect when the I/O card is accessed by the microprocessor of FIG. 3 not entailing wait state.
Figure 20:
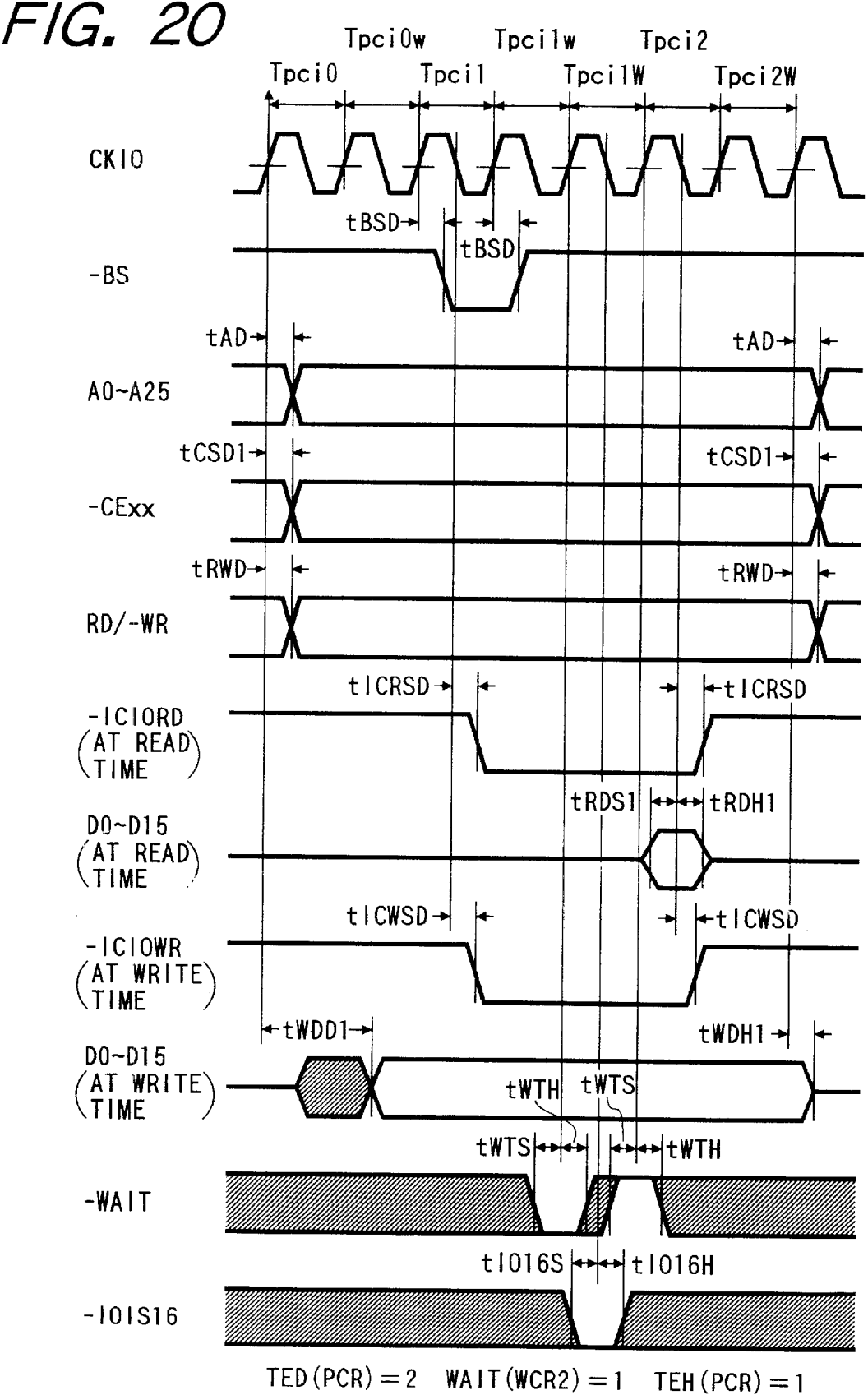
FIG. 20 is a signal waveform view showing typical signal waveforms in effect when the I/O card is accessed by the microprocessor of FIG. 3 entailing wait state.

FIG. 13 indicates a state transition diagram applicable to the bus state controller BSC of FIG. 12. FIG. 14 is a table indicating typical states applicable to the states of the bus state controller BSC shown in FIG. 13. FIG. 15 is a table of typical transition conditions for the bus state controller BSC of FIG. 13. FIG. 16 shows typical signal waveforms in effect when the memory card MEMC is accessed by the microprocessor MPU of FIG. 3 not entailing wait state, FIG. 17 shows typical signal waveforms in effect when the memory card MEMC is accessed by the microprocessor MPU entailing wait state, and FIG. 18 shows typical signal waveforms in effect when the memory card MEMC is accessed by the microprocessor MPU in burst mode. FIG. 19 illustrates typical signal waveforms in effect when the I/O card IOC is accessed by the microprocessor MPU not entailing wait state, and FIG. 20 depicts typical signal waveforms in effect when the I/O card IOC is accessed by the microprocessor MPU entailing wait state. In a detailed description that follows regarding the state transition of the bus state controller BSC as outlined in FIG. 13, the reader is asked to refer to FIGS. 14 through 20 where necessary. The states shown in FIGS. 13 through 15 are only a part of the states for control over the SRAM; burst ROM and PC cards. The bus state controller BSC has many other states regarding control of other semiconductor memories. FIGS. 16 through 20 include for reference the I/O clock signal CKIO, bus start signal -BS and read/write status signal RD/-WR which are not supplied to the memory card MEMC and I/O card IOC. The I/O clock signal CKIO used as the system clock or as the operation clock signal of the central processing unit CPU serves as the basic clock signal by which to generate diverse timing signals shown in FIGS. 16 through 20.

In FIG. 13, the bus state controller BSC of this embodiment acts as a so-called state machine having 10 states ST1 through ST10 for control over the SRAM, burst ROM, memory card MEMC and I/O card IOC. Of these states, state ST1 is an idle state corresponding to the wait state of the microprocessor MPU, as shown in FIG. 14. States ST2, ST3 and ST4 denote a PCMCIA TED1 state, a PCMCIA TED2 state and a PCMCIA TED3 state, respectively. The three states are used to delay by one cycle the time to set up the address signals A0 through A25 for the write enable signal -WE1 and output enable signal -OE serving as the start control signals of the PCMCIA, i.e., the memory card MEMC and I/O card IOC. States ST5, ST6 and ST7 represent respectively a NORM T1 state corresponding to an access start cycle, a NORM TW state corresponding to a wait cycle, and a NORM T2 state corresponding to an access end cycle. States ST8, ST9 and ST10 denote respectively a PCMCIA TEH1 state, a PCMCIA TEH2 state and a PCMCIA TEH3 state, each being used to delay by one cycle the time to hold the address signals A0 through A25 for the write enable signal -WE1 and output enable signal -OE. States ST1 through ST10, listed to match the cycle names in the "Corresponding Cycle" column in FIG. 14, are keyed to the corresponding cycles that are illustrated in FIGS. 16 through 20.

Suppose that transition condition No. 1 in FIG. 15 is met with the bus state controller BSC in state ST1 (i.e., idle state). This means that the external bus E-BUS is free; that a request for access to a memory, i.e., to the external bus E-BUS has occurred; and that the constant TED set in the PCMCIA control register PCR regarding the delay of the setup time is 1, 2 or 3. In that case, the bus state controller BSC enters state ST2 wherein a delay cycle for the time to set up the write enable signal -WE1 and output enable signal -OE is initiated. At this point, in the memory card MEMC and I/O card IOC, a Tpcm0 cycle or a Tpci0 cycle is used to delay by one cycle of the I/O clock signal CKIO the time to set up the bus start signal -BS, i.e., write enable signal -WE1 and output enable signal -OE (read control signal -RD), as shown in FIGS. 17 and 20.

Suppose now that transition condition No. 4 in FIG. 15 is met. This means that the one-cycle delay of the setup time in state ST2 has ended and that the constant TED in the PCMCIA control register PCR is 2 or 3. In that case, the bus state controller BSC enters state ST3 wherein a delay cycle for the time to set up the write enable signal -WE1 and output enable signal -OE is again initiated. At this point, in the memory card MEMC and I/O card IOC, a Tpcm0w cycle or a Tpci0w cycle is used to delay by another cycle of the I/O clock signal CKIO the time to set up the bus start signal -BS, i.e., write enable signal -WE1 and output enable signal -OE, as shown in FIGS. 17 and 20.

Suppose now that transition condition No. 3 in FIG. 15 is met. This means that the one-cycle delay of the setup time in state ST3 has ended and that the constant TED in the PCMCIA control register PCR is 2. In that case, the bus state controller BSC enters state ST5 wherein an access start cycle is initiated. At this point, in the memory card MEMC and I/O card IOC, a Tpcm1 cycle or a Tpci1 cycle is used to get the bus start signal -BS, i.e., output enable signal -OE (I/O read control signal ICIORD) or write enable signal, -WE1 (I/O write control signal -ICIOWR) driven Low to the valid level, as shown in FIGS. 17 and 20. This effectively triggers data write or read operations to or from the addresses designated by the address signals A0 through A25.

Suppose that transition condition No. 2 is met in which the one-cycle delay of the setup time in state ST2 has ended and in which the constant TED in the PCMCIA control register PCR is 1. In that case, the bus state controller enters state ST5 wherein an access start cycle is initiated. If transition condition No. 5 is met in which the one-cycle delay of the setup time in state ST3 has ended and in which the constant TED in the PCMCIA control register PCR is 3, then the bus state controller BSC enters state ST4. In this state, the time to set up the write enable signal -WE1 and output enable signal -OE is delayed by another cycle. When transition condition N. 6 is met in which the one-cycle delay of the setup time in step ST4 has ended, state ST5 is reached.

Suppose now that transition condition No. 7 is met with the bus state controller BSC in state ST1 (i.e., idle state). This means that the external bus E-BUS is free, that a request for access to a memory has occurred, and that the constant TED in the PCMCIA control register PCR is 0. In that case, the bus state controller BSC directly enters state ST5 wherein an access start cycle is initiated. At this point, in the memory card MEMC and I/O card IOC, a Tpcm1 cycle or a Tpci1 cycle is executed without the intervention of a cycle for delaying the time to set up the write enable signal -WE1 and output enable signal -OE, as shown in FIGS. 16 and 19. This permits access to the target memory for writing or reading data thereto or therefrom.

Suppose that transition condition No. 9 is met in which the access start cycle in state ST5 has ended and in which the constant WAIT in the wait control register WCR2 is illustratively 1. In that case, the bus state controller BSC enters state ST6 wherein a wait cycle is initiated. At this point, in the memory card MEMC and I/O card IOC, one wait state made up of two Tpcm1w or Tpci1w cycles is inserted in order to delay driving High the output enable signal -OE (I/O read control signal -ICIORD) or write enable signal -WE1 (I/O write control signal -ICIOWR), i.e., to delay the end of the data write or read operation, as shown in FIGS. 17 and 20. During the delay, the wait control signal -WAIT is brought Low in a time period encompassing the next leading edge of the I/O clock signal CKIO that occurs, and is driven back in a time period comprising the subsequent leading edge of the signal CKIO.

When transition condition No. 12 is met in which the wait cycle in state ST6 has ended, the bus state controller BSC enters state ST7 wherein an access end cycle is initiated. At this point, in the memory card MEMC and I/O card IOC, a Tpcm2 or Tpci2 cycle is used to drive back High the output enable signal -OE (I/O read control signal -ICIORD) or write enable signal -WE1 (I/O write control signal -ICIOWR) to the invalid level, as shown in FIGS. 16 through 20. This terminates the data write or read operation to or from the designated address. Suppose that transition condition No. 10 is met with the bus state controller BSC in state ST6. This means that the constant WAIT in the wait control register WCR2 is other than 2 and that the wait state needs to remain in effect. In that case, the bus state controller BSC inserts another wait cycle using state ST6.

When the access end cycle based on state ST7 has ended, the bus state controller BSC goes selectively to state ST1, ST2, ST5 or ST6 depending on the ending state of burst mode or all cycles and on the constants TED and TEH in the PCMCIA control register PCR, i.e., the delay conditions for the setup time and hold time. That is, if transition condition No. 12 is met in which burst mode has yet to be ended during the access end cycle of state ST7, the bus state controller BSC returns to state ST6. The process is repeated until burst mode ends. At this point, in the memory card MEMC and I/O card IOC, as many bus start signals -BS and output enable signals -OE as the number of bursts are generated intermittently, as shown in FIG. 18. Concurrently, the address controller ADC of the bus state controller BSC successively generates the low-order four-bit address signals A0 through A3 to perform consecutive access to a series of addresses.

Meanwhile, suppose that transition condition No. 13 is met. This means that the access end cycle based on state ST7 has ended, that all cycles of byte- or word-based divided access operations effected because of a limited bus size have yet to be ended, and that the setup time and hold time need not be delayed. In that case, the bus state controller BSC returns to state ST5 and repeats the access operation. At this point, suppose that transition condition No. 14 is met in which the setup time needs to be delayed. This causes the bus state controller BSC to enter state ST2. If transition condition No. 16 or 18 is met in which the hold time needs to be delayed, the bus state controller BSC goes to state ST8, ST9 or ST10 depending on the number of the delay cycles needed.

The burst mode for the memory card MEMC and I/O card IOC in connection with areas 5 and 6 is furnished so as to implement 16-byte access operations to a cache file in the same manner as in the page mode of a burst ROM. In this case, the number of data transfer operations in burst mode may be set using the bus control register BCR1. The number of consecutive access operations may be selected from three options: 4, 8 or 16 times. In the first access cycle of burst mode for reading data, the data designated by the read request is accessed; in the remaining cycles, the 16-byte boundary data including the data in question is accessed in wrap around fashion. In burst mode for writing data, 16-byte boundary data is written consecutively to the region corresponding to the data, starting from the first address of that region. The number of wait states inserted during the first access and from the second access onward is set selectively using the constant WAIT in the wait control register WCR2, as mentioned above.

When transition condition No. 15 is met in which all cycles are confirmed ended in the access end cycle of state ST7 and in which the hold time need not be delayed, the bus state controller BSC returns to state ST1. At this point, suppose that transition condition No. 16, 17 or 18 is met. This means that the constant TEH in the PCMCIA control register PCR is at least 1 and that the hold time needs to be delayed. In that case, the bus state controller BSC goes selectively to state ST8, ST9 or ST10 depending on the number of delay cycles involved, i.e., according to the value of the constant TEH in the PCMCIA control register PCR.

Suppose that the bus state controller BSC enters a delay cycle in state ST8 after transition condition No. 16 has been met. In that case, in the memory card MEMC and I/O card IOC, a Tpcm2w or a Tpci2w cycle is inserted in order to delay by one cycle the hold time between the rise of the output enable signal -OE (I/O read control signal -ICIORD) or write enable signal -WE1 (I/O write control signal -ICIOWR) and the next transition of the address signals A0 through A25, as shown in FIGS. 17 and 20. When the bus state controller BSC enters a delay cycle of state ST9 after transition condition No. 17 has been met, two Tpcm2w or Tpci2w cycles are inserted so as to delay by two cycles the hold time in question. If the bus state controller BSC enters a delay cycle of state ST9 after transition condition No. 18 has been met, three Tpcm2w or Tpci2w cycles are inserted to delay the hold time by three cycles.

At the end of the delay cycle in state ST8, the same ending condition as in state ST7 is selected. The bus state controller BSC goes selectively to state ST1, ST2 or ST5 depending on the ending state of all cycles and in accordance with the constant TED in the PCMCIA control register PCR, i.e., according to the delay condition for the setup time. That is, if transition condition No. 22 is met in which all cycles have yet to be ended at the end of the delay cycle in state ST8 and in which the setup time need not be delayed, the bus state controller BSC returns to state ST5; if transition condition No. 21 is met in which the setup time needs to be delayed, the bus state controller BSC returns to state ST2. The access is then repeated in each case. When transition condition No. 23 is met in which all cycles are confirmed ended in state ST8, the bus state controller BSC returns to state ST1 (idle state).

In the manner described, the bus state controller BSC having complex functions to deal with various semiconductor memories and PC cards may be used as a state machine whose transition conditions are set selectively by updating the constants in the control registers. This arrangement makes it possible to align efficiently the interface conditions for areas 0 through 6 of the external bus E-BUS with those of the semiconductor memories and PC cards connected to these areas. At the same time, the logic structure of the bus state controller BSC is simplified while the flexibility of the controller as it constitutes part of the system is enhanced.

Figure 21:
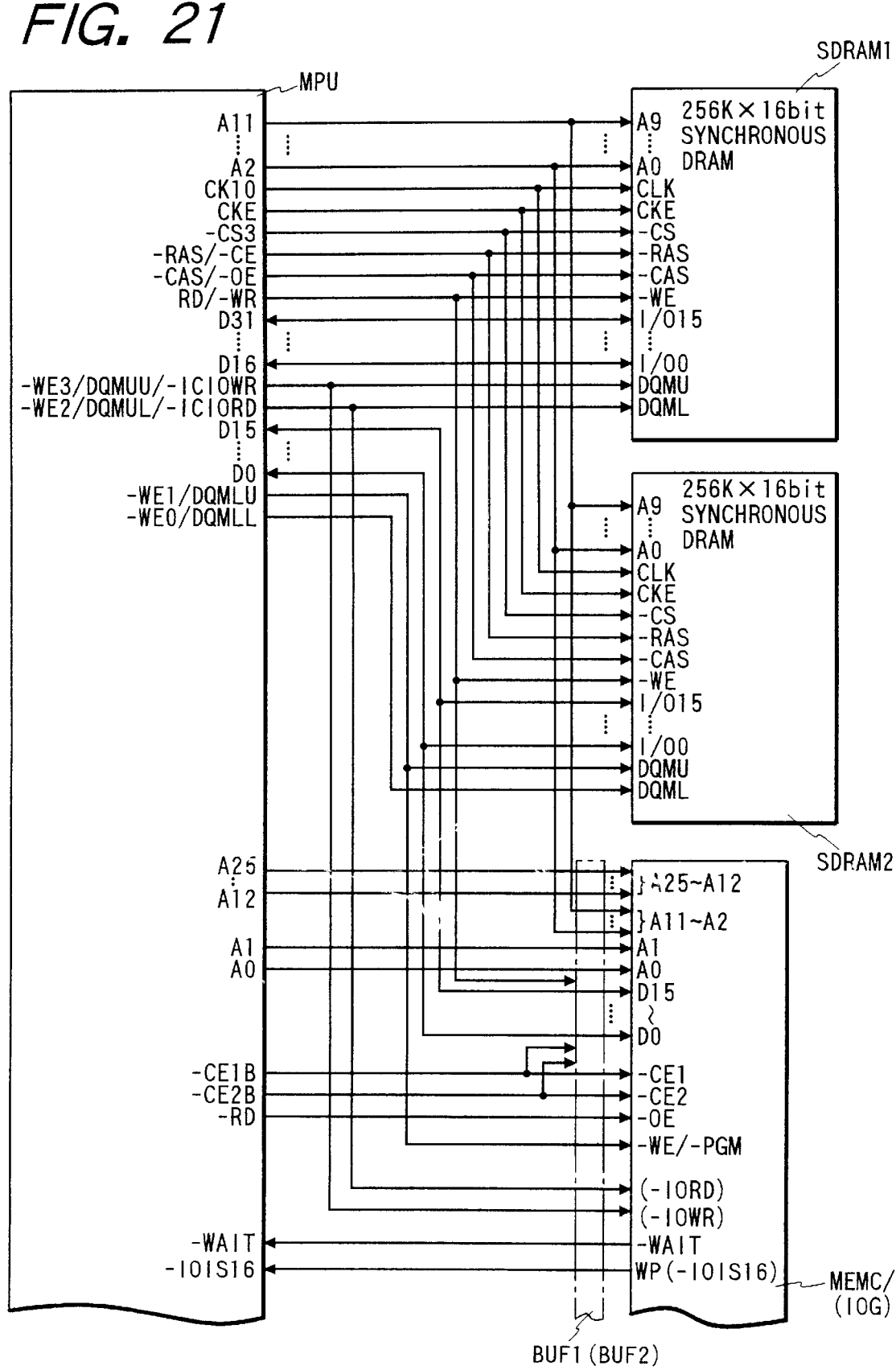
FIG. 21 is an interface block diagram partially depicting an example in which a PC card and synchronous DRAMs are connected to the microprocessor of FIG. 3.

FIG. 21 is an interface block diagram of a connection example in which synchronous DRAMs and a PC card (MEMC/(IOC)) are connected to the microprocessor MPU of this invention. Since how the PC card (MEMC/(IOC)) and the microprocessor MPU are interconnected was discussed earlier in detail with reference to FIG. 9, FIG. 21 shows only a part of the connections involved, and the description of the connections in FIG. 21 will be omitted where redundant.

As shown in FIG. 21, an SDRAM1 and an SDRAM2 have a memory structure of 256 K×16 bits each. The SDRAM1 comprises: address terminals A9 through A0 connected to receive address signals A11 through A2 output by the microprocessor MPU; a clock terminal CKL connected to the system clock I/O terminal CKIO of the microprocessor MPU; a clock enable signal terminal CKE connected to the clock enable signal terminal CKE of the microprocessor MPU; a chip select signal terminal -CS connected to the chip select signal terminal -CS3 of the microprocessor MPU; a row address strobe signal -RAS connected to the row address strobe signal terminal -RAS/-CE of the microprocessor MPU; a column address strobe signal terminal -CAS connected to the column address strobe signal terminal -CAS/-OE of the microprocessor MPU; a write enable signal terminal -WE connected to the read/write status signal terminal RD/-WR of the microprocessor MPU; data I/O terminals I/O15 through I/O0 connected respectively to the data I/O terminals D31 through D16 of the microprocessor MPU; and data control signal terminals DQMU and DQML connected respectively to the data control signal terminals DQMUU and DQMUL of the microprocessor MPU.

The SDRAM2 includes: address terminals A9 through A0 connected to receive address signals A11 through A2 output by the microprocessor MPU; a clock terminal CKL connected to the system clock I/O terminal CKIO of the microprocessor MPU; a clock enable signal terminal CKE connected to the clock enable signal terminal CKE of the microprocessor MPU; a chip select signal terminal -CS connected to the chip select signal terminal -CS3 of the microprocessor MPU; a row address strobe signal -RAS connected to the row address strobe signal terminal -RAS/-CE of the microprocessor MPU; a column address strobe signal terminal -CAS connected to the column address strobe signal terminal -CAS/-OE of the microprocessor MPU; a write-enable signal terminal -WE connected to the read/write status signal terminal RD/-WR of the microprocessor MPU; data I/O terminals I/O15 through I/O0 connected respectively to the data I/O terminals D15 through D0 of the microprocessor MPU; and data control signal terminals DQMU and DQML connected respectively to the data control signal terminals DQMLU and DQMLL of the microprocessor MPU.

Where the microprocessor MPU is connected as shown in FIG. 21 with the synchronous DRAMs (SDRAM1, SDRAM2) offering high-speed address access time, the synchronous DRAMs may be utilized as a 32-bit-wide memory in the setup. The system clock signal output from the system clock I/O terminal CKIO of the microprocessor MPU is a clock signal having the same frequency as that of the operation clock signal of the central processing unit CPU. The system clock signal is also fed to the bus state controller BSC.

Figure 22:
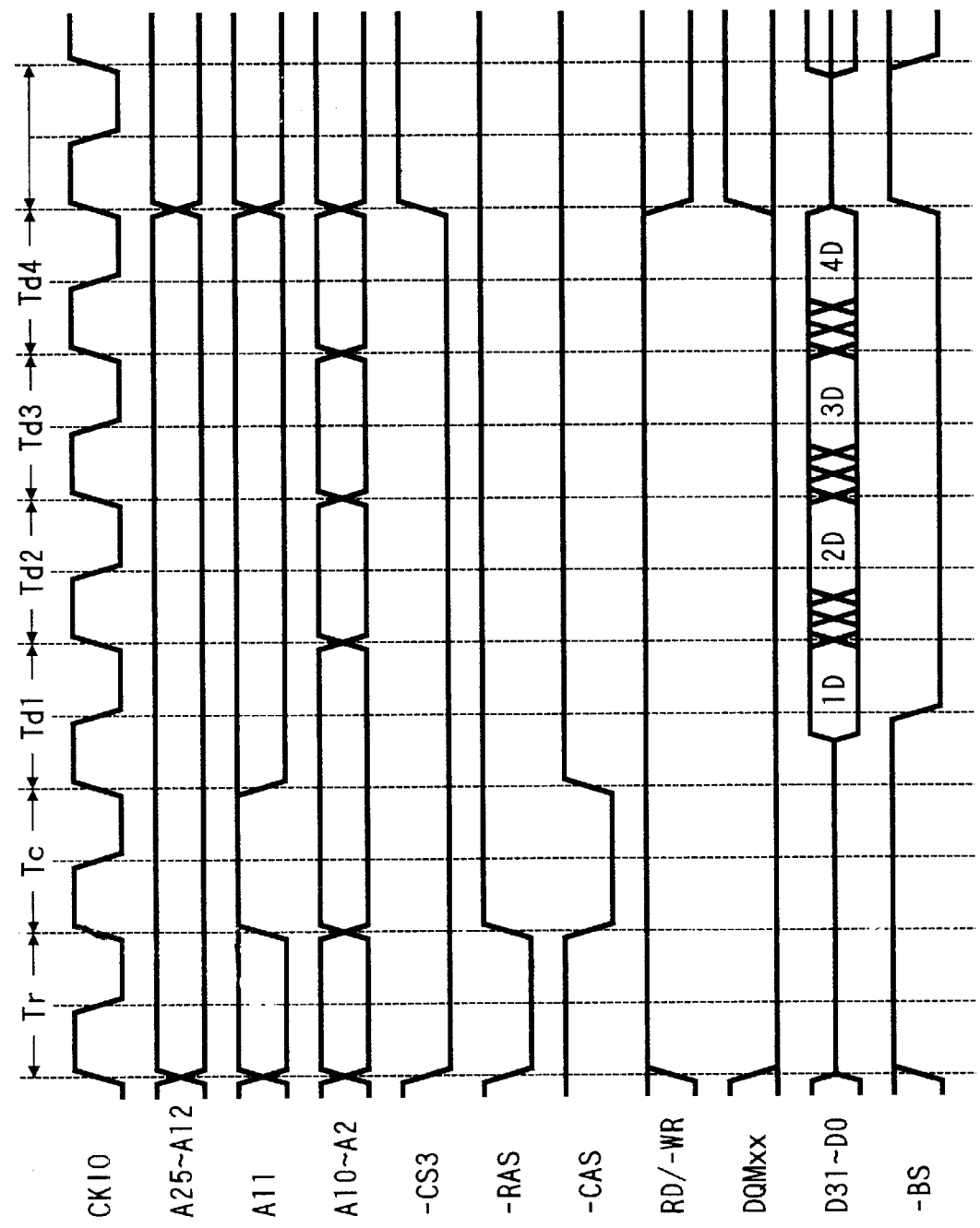
FIG. 22 is a signal waveform view showing typical signal waveforms in effect when a synchronous DRAM is accessed.

FIG. 22 illustrates bus cycle waveforms which are used to explain hereunder the burst read operation of the synchronous DRAM (SDRAM1, SDRAM2). Although omitted from FIG. 22, the clock enable signal CKE is assumed to be held High. When the synchronous DRAM is refreshed, the clock enable signal CKE is brought Low selectively. The bus start signal -BS is a strobe signal for monitoring the bus cycles and is not connected to the synchronous DRAM.

In the first cycle Tr, the signal -CS3 corresponding to the space area to which the synchronous DRAM is assigned is driven Low, and the row address strobe signal -RAS is also brought Low. This causes the appropriate row address to be moved into the synchronous DRAM. In the next cycle Tc, the column address strobe signal -CAS is driven Low, causing the appropriate column address to be taken into the synchronous DRAM. In this manner, the appropriate signals (-CS2, -RAS, -CAS and address signals output in synchronism with a leading edge of the clock signal CKIO from the CPU) are brought into the synchronous DRAM in synchronism with a leading edge of the clock signal CKIO. That is, the read operation and other operations, not shown, on the synchronous DRAM are controlled on the basis of the clock signal CKIO.

In the third cycle Td1, the signal -CAS is reset and driven High. Over four cycles starting from the third cycle (Td1–Td4), data D31 through D0 are read consecutively from the synchronous DRAM. Such a burst read operation allows 16 bytes of data (4 bytes×4 cycles) to be read out. The control signals based on the above-described timings are generated by the bus state controller BSC.

Figure 23:
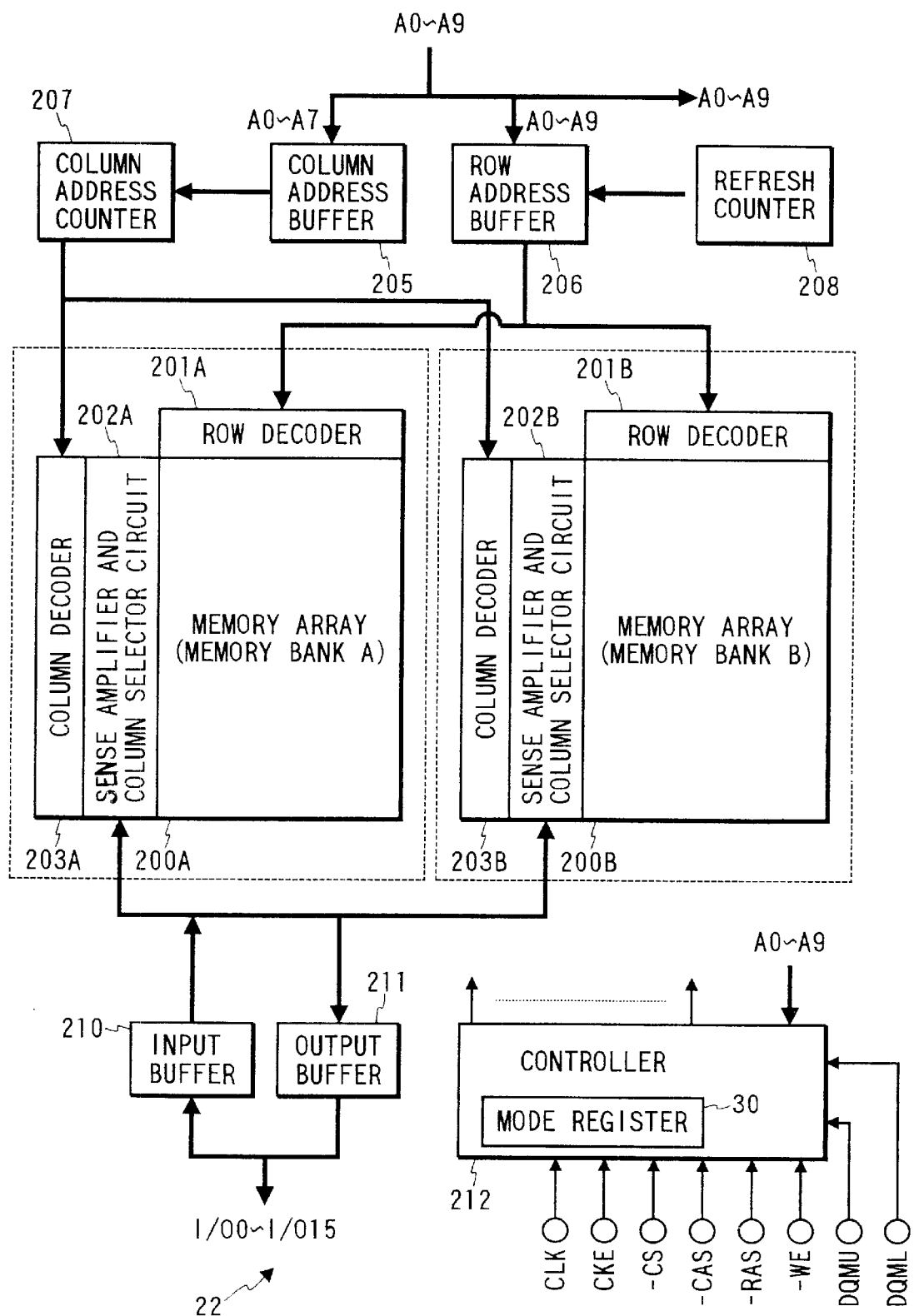
FIG. 23 is a block diagram of a typical synchronous DRAM.

FIG. 23 is a block diagram of a typical synchronous DRAM (simply called SDRAM). The kind of SDRAM shown in FIG. 23 is formed, but not limited, by known semiconductor integrated circuit fabrication techniques on a single semiconductor substrate composed illustratively of single crystal silicon.

The SDRAM of FIG. 23 comprises a memory array 200A constituting a memory bank A (BANKA) and a memory array 200B making up a memory bank B (BANKB). The memory arrays 200A and 200B are each made up of dynamic memory cells arranged in matrix fashion. Referring to FIG. 23, a selection terminal for memory cells constituting a single column is connected to a word line (not shown) coupled to the column in question. A data I/O terminal for memory cells forming a single row is connected to a complementary data line (not shown) coupled to the row in question.

One of the word lines, not shown, of the memory array 200A is driven to the selection level in accordance with the output of a row decoder 201A having decoded a row address signal. The complementary data lines, not shown, of the memory array 200A are connected to a sense amplifier and column selector circuit 202A. A sense amplifier in the sense amplifier and column selector circuit 202A, is an amplifier circuit that detects and amplifies a small potential difference that appears on individual complementary data lines in the event of a data read operation on memory cells. A column switching circuit in the sense amplifier and column selector circuit 202A is a switching circuit that selects any one of the complementary data lines for conduction to a complementary common data line 204. The column switching circuits function selectively in accordance with the output of a column decoder 203A having decoded a column address signal. A row decoder 201B, a sense amplifier and column selector circuit 202B, and a column decoder 203B are likewise furnished on the side of the memory array 200B. The complementary common data line 204 is connected to the output terminal of an input buffer 210 and to the input terminal of an output buffer 211. The input terminal of the input buffer 210 and the output terminal of the output buffer 211 are connected to the 16-bit data I/O terminals I/O0 through I/O15.

The column and row addresses supplied from the address input terminals A0 through A9 are brought into a column address buffer 205 and a row address buffer 206 on an address multiplex basis. The supplied address signals are retained in the respective buffers. In refresh operation mode, the row address buffer 206. receives as a row address the refresh address signal from a refresh counter 208. The output of the column address buffer 205 is sent as preset data to a column address counter 207. In the operation mode designated illustratively by a command, the column address counter 207 outputs to the column decoder 203A or 203B the column address signal received as preset data or a column address signal having been incremented successively.

A controller 212 is connected to, but not limited by, an input terminal CLK for receiving the clock signal CKIO, an input terminal for receiving the clock enable signal CKE, an input terminal for receiving the chip select signal -CS, an input terminal for receiving the column address strobe signal -CAS, an input terminal for receiving the row address strobe signal -RAS, an input terminal for receiving the write enable signal -WE, and input terminals for receiving data control signals DQMU and DQML. The controller 212 is supplied with external control signals via the above-described input terminals and with control data through the address input terminals A0 through A9. On the basis of the level changes in these signals and according to the timings thereof, the controller 212 generates internal timing signals by which to control the operation mode of the SDRAM and the operation of the circuit blocks outlined above. When acting in this fashion, the controller 212 utilizes control logic circuits, not shown, and a mode register 30 incorporated therein.

The clock signal CKIO is regarded as the master clock of the SDRAM. The other externally input signals are made significant in synchronism with leading edges of the clock signal CKIO. The chip select signal -CS designates the start of a command input cycle when driven Low. The chip select signal -CS has no meaning when brought High (representing a chip nonselected state) or in other input states. It should be noted that the memory bank selection state and such internal operations as a burst operation are not affected by the transition to the chip nonselected state. The signals -RAS, -CAS and -WE differ in function from the corresponding signals for the ordinary DRAM; they are made significant only when command cycles are defined.

The row address signal is defined by the levels of the terminals A0 through A8 in a row address strobe bank active command cycle synchronized with a leading edge of the clock signal CKIO. In the row address strobe bank active command cycle, the input from the terminal A0 is regarded as a bank selection signal. Specifically, when the input from the terminal A9 is Low, the memory bank BANKA is selected: when the input from the terminal A9 is High, the memory bank BANKB is selected. Memory bank selection is controlled, but not limited, by such processes as activation of the row decoder alone on the side of the selected memory bank, nonselection of all column switching circuits on the side of the nonselected memory bank, and connection of only the selected memory bank to the input buffers 210 and 211. The input from the terminal A8 in a pre-charge command cycle designates how pre-charging is to be carried out on complementary data lines. When the input from the terminal A8 is High, both memory banks are designated to be pre-charged; when the input from the terminal A8 is Low, one memory bank designated by the input from the terminal A9 is to be pre-charged. The column address signal is defined by the levels of the terminals A0 through A7 in a read or write command (column address read command or column address write command) cycle synchronized with a leading edge of the clock signal CKIO. The column address thus defined is regarded as the start address for a burst access operation.

As described, the operation of the synchronous DRAM is controlled on the basis of the clock signal CKIO. The memory card MEMC and I/O card IOC furnished as PC cards are also controlled in accordance with the clock signal CKIO, as is understood from the preceding description of how the bus state controller BSC operates. It follows that where the PC cards (memory card MEMC, I/O card IOC) are controlled in operation while the synchronous DRAM is running at high speed, it may happen that the required time to set up the output enable signal -OE or write enable signal -WE as a PC card start signal with regard to the decay of the clock signal CKIO or to the address signals fails to meet the corresponding PC card standards. In such cases, as is understood from the description above of how the bus state controller BSC works with reference to FIGS. 17 and 20, the bus state controller BSC utilizes the PCMCIA control register PCR furnished therein. On the basis of the constant TED regarding the setup delay or the constant TEH regarding the hold delay in the PCMCIA control register PCR, the bus state controller BSC controls the time to set up or hold the output enable signal -OE or write enable signal -WE as the PC card start signal with regard to the decay of the clock signal CKIO or to the address signals.

The arrangement above thus controls the time to set up the output enable signal -OE or write enable signal -WE as the PC card start signal with regard to the decay of the clock signal CKIO or to the address signals. This makes it possible fox the microprocessor MPU of the invention to gain access to the PC cards and synchronous DRAMs with no problem even where these cards and memories are connected concurrently to the microprocessor MPU.

The effects offered by the embodiment above are summarized below.

(1) The microprocessor to be incorporated in personal computers and the like is equipped with the bus state controller which is connected to the external bus of the microprocessor and which controls parallel the interfaces of various semiconductor memories (ROM, burst ROM, SRAM, PSRAM, DRAM and synchronous DRAM) and PC cards (memory card and I/O card). Constituted as described, the inventive microprocessor reduces the number of externally attached parts for interface control while allowing the semiconductor memories and PC cards to be connected directly and concurrently to the external bus of the microprocessor.

(2) With the embodiment structured as summarized in paragraph (1) above, the address space of the external bus is divided into a predetermined number of areas to which the semiconductor memories and PC cards are fixedly assigned. The microprocessor also includes the memory management unit for converting an internal logical address to the corresponding physical address applicable to the external bus. This arrangement frees the user from the constraints of physical addresses regarding the external bus E-BUS, and makes it possible to write a program having a freely designed logical address space.

(3) With the embodiment structured as summarized in paragraphs (1) and (2) above, the physical address space assigned to the I/O card is further divided into two portions. That is, the physical addresses for the I/O card acting as a memory are assigned separately from those for the I/O card functioning as an I/O device. The address space areas thus furnished are designated selectively using specific bits in the address signal. In this manner, the I/O card is switched dynamically between the memory function and the I/O device function on a software basis.

(4) With the embodiment structured as summarized in paragraphs (1) through (3) above, the bus state controller is regarded as a state machine. This bus state controller comprises control registers whereby the types and the operating conditions of the semiconductor memories and PC cards assigned to the various areas are readily set on a software basis. This makes it possible to align efficiently the interface conditions for each of the areas with those of the semiconductor memories and PC cards. At the same time, the logic structure of the bus state controller is simplified while the flexibility of the controller as it constitutes part of the system is enhanced.

(5) With the embodiment structured as summarized in paragraphs (1) through (4) above, the bus state controller is equipped with the function to generate addresses in burst mode. This makes it possible to connect the semiconductor memories and PC cards having burst mode to the microprocessor without increasing the number of externally attached parts of the microprocessor while boosting the speed of access to the memories and cards.

(6) With the advantages summarized in paragraphs (1) through (5) above, the inventive microprocessor is easy and convenient to use. When incorporated in a personal computer having the PC card interface, the microprocessor helps reduce the number of steps to design the computer. With its externally attached parts thus reduced in quantity, the microprocessor allows the personal computer or the like to cost less to fabricate.

Although the description above contains many specificities, these should not be construed as limiting the scope of the invention but as merely providing illustrations of the presently preferred embodiments. It is evident that many alternatives, modifications and variations will become apparent to those skilled in the art in light of the foregoing description. For example, in FIG. 1, the types, quantities and combination of the semiconductor memories and PC cards connected to the external bus E-BUS of the microprocessor MPU (i.e., mother board MBD) may be varied as needed. The personal computer may have various I/O devices and may take any one of diverse block constitutions and connection forms. With reference to FIGS. 2(A) through 2(C), the personal computer may take any one of other external appearances. In FIG. 3, the microprocessor MPU may take any other block constitution and bus makeup. The basic layout of the microprocessor MPU shown in FIG. 4 is but one of many other possible layouts and is not limitative of the invention.

With reference to FIGS. 5 and 6, the physical address space of the external bus E-BUS may be divided into any number of areas to which semiconductor memories and/or PC cards may be assigned as desired. The examples in FIGS. 7 through 11 do not limit the invention in terms of the signal composition for the external bus E-BUS, the valid levels and functions of the signals used, and the combination of semiconductor memories and PC cards.

Referring to FIG. 12, the block constitution of the bus state controller BSC including the types and combination of the registers used may be varied as needed. In FIGS. 13 through 15 regarding the bus state controller BSC acting as a state machine, the logic constitution and the functions and transition conditions for various states may vary. The examples in FIGS. 16 through 20 are not limitative of the invention in terms of the logic levels of and temporal relations between the address signals and start control signals in various access modes.

The foregoing description has centered primarily on the microprocessor constituting part of the personal computer, which is the background technical field of the inventors. However, this particular background of the inventors is not limitative of the invention; the invention may also be applied to microprocessor used in various other portable data terminals and computers. The invention is applied extensively to microprocessors comprising at least an external bus and to devices or systems comprising such a microprocessor.

To sum up, the major benefits available with the invention are as follows: the microprocessor for use in personal computers and portable data terminals has the bus state controller which is connected to the external bus and which controls parallelly the interfaces of various semiconductor memories (ROM, burst ROM, SRAM, PSRAM, DRAM and synchronous DRAM) and PC cards (memory card and I/O card). The microprocessor of this constitution reduces the number of externally attached parts for interface control while allowing the semiconductor memories and PC cards to be connected directly and concurrently to the microprocessor.

The address space of the external bus of the microprocessor is divided into a predetermined number of areas to which the semiconductor memories and PC cards are fixedly assigned. The microprocessor also includes the memory management unit for converting an internal logical address to the corresponding physical address applicable to the external bus. The setup frees the user from the constraints of physical addresses regarding the external bus, and makes it possible to write a program having a freely designed logical address space.

The physical address space assigned to the I/O card is further divided into two portions. In this case, the physical addresses for the I/O card acting as a memory are assigned separately from those for the I/O card functioning as an I/O device. The address space areas thus furnished are designated selectively using specific bits in the address signal. The setup allows the I/O card to be switched dynamically between the memory function and the I/O device function on a software basis.

The bus state controller is regarded as a state machine, and includes control registers whereby the types and the operating conditions of the semiconductor memories and PC cards assigned to the various areas are readily set on a software basis. The setup aligns efficiently the interface conditions for each area with those of the semiconductor memories and PC cards. At the same time, the logic structure of the bus state controller is simplified while the flexibility of the controller as it constitutes part of the system is enhanced.

The bus state controller has the function to generate addresses for consecutive access to a series of addresses in burst mode. This connects the semiconductor memories and PC cards having burst mode to the microprocessor without increasing the number of externally attached parts of the microprocessor while boosting the speed of access to the memories and cards.

Offering the advantages above, the microprocessor is easy and convenient to use. When incorporated in a personal computer having the PC card interface, the microprocessor helps reduce the number of steps to design the computer. With its externally attached parts thus reduced in quantity, the microprocessor allows the personal computer or the like to cost less to fabricate.

What is claimed is:

1. A data processing system comprising:
    a data processor adapted so that it may be coupled to a PC card;
    a read only memory (ROM);
    a dynamic random access memory (DRAM);
    a first PC card connector connectable to a PC card; and
    an external bus coupled to the data processor, the ROM, the DRAM, and the first PC card connector;
    wherein the data processor accesses the external bus based on a physical address in an address space, wherein the address space is divided into a plurality of areas assigned fixedly to the ROM, the DRAM and the PC card; and
    wherein the data processor comprises:
        a central processing unit, wherein the central processing unit outputs an internal logical address; and
        a memory management unit coupled to the central processing unit, wherein the memory management unit outputs a physical address applicable to the external bus based on the internal logical address.

2. A data processing system according to claim 1, the data processing system further comprising:
    a second PC card connector connectable to the external bus;
    wherein the first PC card connector and the second PC card connector are concurrently connected with a memory card or an I/O card, respectively.

3. A data processing system according to claim 2, the data processing system further comprising:
    a first buffer circuit coupled between the first PC card connector and the external bus; and
    a second buffer circuit coupled between the second PC card connector and the external bus.

4. A data processing system according to claim 3, the data processor further comprising:
    a bus state controller including registers for interface control between the ROM or the DRAM and the data processor and/or between the PC cards and the data processor;
    wherein the registers set operating conditions of the ROM or the DRAM and/or the PC cards assigned to the areas.

5. A data processing system according to claim 1, wherein a plurality of control signals are coupled to/from the data processor, wherein the plurality of control signals include a card detect signal which indicates that a PC card is coupled to the first PC card connector.

6. A data processing system according to claim 5, wherein the PC card is coupled to the first card connector upon turning on of the data processing system.

7. A data processing system comprising:
    a data processor adapted so that it may be coupled to a PC card;
    a read only memory (ROM);
    a synchronous dynamic random access memory (SDRAM);
    a PC card connector connectable a PC card, wherein the PC card comprises a memory card or an I/O card; and
    an external bus coupled to the data processor, the ROM, the SDRAM, and the PC card connector;
    wherein the data processor accesses the external bus based on a physical address in an address space, wherein the address space is divided into a plurality of areas assigned fixedly to the ROM, the SDRAM and the PC card; and
    wherein the data processor comprises:
        a central processing unit, wherein the central processing unit outputs an internal logical address; and
        a memory management unit coupled to the central processing unit, wherein the memory management unit outputs a physical address applicable to the external bus based on the internal logical address.

8. A data processing system according to claim 7, the data processing system further comprising:
    a second PC card connector connectable to the external bus;
    wherein the first PC card connector and the second PC card connector are concurrently connectable with a memory card or an I/O card, respectively.

9. A data processing system according to claim 8, the data processing system further comprising:
    a first buffer circuit coupled between the first PC card connector and the external bus; and
    second buffer circuit coupled between the second PC card connector and the external bus.

10. A data processing system according to claim 9, the data processor further comprising:
    a bus state controller including registers for interface control between the ROM or the SDRAM and the data processor and/or between the PC cards and the data processor;
    wherein the registers set operating conditions of the ROM or the SDRAM and/or the PC cards assigned to the areas.

11. A data processing system according to claim 7, wherein a plurality of control signals are coupled to/from the data processor, wherein the plurality of control signals include a card detect signal which indicates that a PC card is coupled to the PC card connector.

12. A data processing system comprising:
    a data processor that may be connected to a PC card;
    read only memory (ROM);
    a random access memory (RAM), wherein the RAM comprises a dynamic random accesses memory (DRAM) or a synchronous dynamic random access memory (SDRAM);
    a PC card connector; and
    an external bus, wherein the external bus includes a data bus and an address bus;
    wherein the external bus is coupled to the data processor, the ROM, the RAM and the PC card connector;
    wherein the data processor accesses an external address space, wherein the external address space is divided into a plurality of areas;

wherein a plurality of control signals are provided between the data processor and external to the data processor;

wherein the PC card connector is capable of coupling to a PC card, wherein the PC card comprises a memory card or an I/O card;

wherein the ROM and RAM are assigned addresses in predetermined areas of the plurality of areas;

wherein, when a PC card is connected to the PC card connector, the PC card is assigned to a predetermined area of the plurality of areas and the data processor accesses the PC card based on the predetermined area;

wherein when the PC card is coupled to the PC card connector, the data processor is provided at least one control signal indicating that the PC card is coupled to the PC card connector.

13. A data processing system according to claim 12, further comprising:

an input control circuit coupled to the external bus;

a display control circuit coupled to the external bus;

an input means coupled to the input control circuit; and a display coupled to the display control circuit.

14. A data processing system according to claim 13, further comprising a buffer circuit coupled between the external bus and the PC card connector.

15. A data processing system according to claim 14, wherein the RAM and the PC card operate in accordance with a burst mode for consecutive access to a series of addresses, wherein the data processor further comprises a bus state controller generating addresses for the burst mode.

16. A data processing system according to claim 12, wherein the at least one control signal provided to the data processor indicating that the PC card is coupled to the PC card connector is clamped at a predetermined voltage level.

17. A data processing system comprising:

a data processor, wherein the data processor is adapted to be capable of coupling to a PC card, wherein a plurality of control signals are provided between the data processor and external to the data processor;

a read only memory (ROM);

a random access memory (RAM), wherein the RAM comprises a dynamic random accesses memory (DRAM) or a synchronous dynamic random access memory (SDRAM);

one or more PC card connectors, wherein each of the one or more PC card connectors are able to couple to a PC card that includes memory and/or I/O circuits; and an external bus, wherein the external bus includes a data bus and an address bus, wherein the external bus is coupled to the data processor, the ROM, the RAM and the one or more PC card connectors;

wherein the data processor accesses an external address space, wherein the external address space is divided into a plurality of areas, wherein the ROM, RAM and one or more PC cards are assigned addresses in predetermined areas of the plurality of areas;

wherein, when a PC card is coupled to the PC card connector, the data processor is provided at least one of the control signals;

wherein one of the control signals provides an indication that the PC card is coupled to the PC card connector; and wherein the data processor accesses the PC card based on addresses in one of the predetermined areas that is assigned to the PC card.

18. A data processing system according to claim 17, further comprising:

an input control circuit coupled to the external bus;

a display control circuit coupled to the external bus;

an input device coupled to the input control circuit; and a display coupled to the display control circuit.

19. A data processing system according to claim 17, further comprising a buffer circuit coupled between the external bus and the one or more PC card connectors, wherein the control signal providing an indication that the PC card is coupled to the PC card connector is provided from outside of the PC card connector.

20. A data processing system according to claim 17, wherein the RAM and at least one of the one or more PC cards operate in accordance with a burst mode for consecutive access to a series of addresses, wherein the data processor further comprises a bus state controller generating addresses for the burst mode.

21. A data processing system according to claim 17, wherein the data processor comprises:

a central processing unit, wherein the central processing unit outputs an internal logical address; and a memory management unit coupled to the central processing unit, wherein the memory management unit outputs a physical address based on the internal logical address.

22. A data processing system according to claim 17, wherein the data processor includes a bus state controller including interface control registers, wherein operating conditions of the ROM, RAM and/or the PC cards are determined in accordance with the contents of the interface control registers.

23. A data processing system according to claim 17, further comprising a plurality of registers, wherein at least one of the control signals is provided via a signal line provided between the PC card and the data processor, wherein the signal line is coupled to a predetermined voltage level via one of the registers.

* * * * *